United States Patent
Zacharias et al.

(10) Patent No.: US 12,381,828 B2
(45) Date of Patent: Aug. 5, 2025

(54) DOWNLINK DATA STALL OPTIMIZATION BY ADDRESSING AN OUT-OF-ORDER PACKET SEQUENCE

(71) Applicant: QUALCOMM Incorporated, San Diego, CA (US)

(72) Inventors: Leena Zacharias, San Jose, CA (US); Arnaud Meylan, San Diego, CA (US); Arun Prasanth Balasubramanian, San Diego, CA (US); Ankur Srivastava, Lucknow (IN); Jason Tan, San Diego, CA (US); Tao Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 18/008,810

(22) PCT Filed: Jul. 16, 2021

(86) PCT No.: PCT/CN2021/106852
§ 371 (c)(1),
(2) Date: Dec. 7, 2022

(87) PCT Pub. No.: WO2022/012676
PCT Pub. Date: Jan. 20, 2022

(65) Prior Publication Data
US 2023/0224252 A1     Jul. 13, 2023

(30) Foreign Application Priority Data

Jul. 17, 2020   (IN) .............................. 202041030553

(51) Int. Cl.
*G06F 15/173*   (2006.01)
*H04L 47/34*   (2022.01)

(52) U.S. Cl.
CPC .................................... *H04L 47/34* (2013.01)

(58) Field of Classification Search
USPC ......................................................... 709/238
See application file for complete search history.

(56) References Cited

U.S. PATENT DOCUMENTS

2002/0110095 A1   8/2002 Jiang et al.
2014/0160935 A1*  6/2014 Zecharia ............. H04L 47/2408
                                                       370/235

(Continued)

FOREIGN PATENT DOCUMENTS

WO   WO-2020093230 A1   5/2020

OTHER PUBLICATIONS

International Search Report and Written Opinion—PCT/CN2021/106852—ISA/EPO—Oct. 22, 2021.

*Primary Examiner* — Wing F Chan
*Assistant Examiner* — Andrew Woo
(74) *Attorney, Agent, or Firm* — Loza & Loza, LLP

(57) ABSTRACT

Aspects of the present disclosure relate to optimization of packet processing when packets are received out of order in sequence. For example, a user equipment (UE) may determine whether a difference between a sequence number of a first packet and a sequence number of a second packet received subsequent to receiving the first packet exceeds a sequence jump threshold. The UE may disregard the second packet from processing in response to at least determining that the difference is greater than the sequence jump threshold. The UE may receive and process a plurality of packets respectively associated with a plurality of sequence numbers that are greater than the sequence number of the first packet and less than the sequence number of the second packet.

30 Claims, 14 Drawing Sheets

(56) References Cited

U.S. PATENT DOCUMENTS

2017/0155590 A1\* 6/2017 Dillon ................. H04L 12/2867
2018/0279168 A1\* 9/2018 Jheng ...................... H04L 5/001

\* cited by examiner

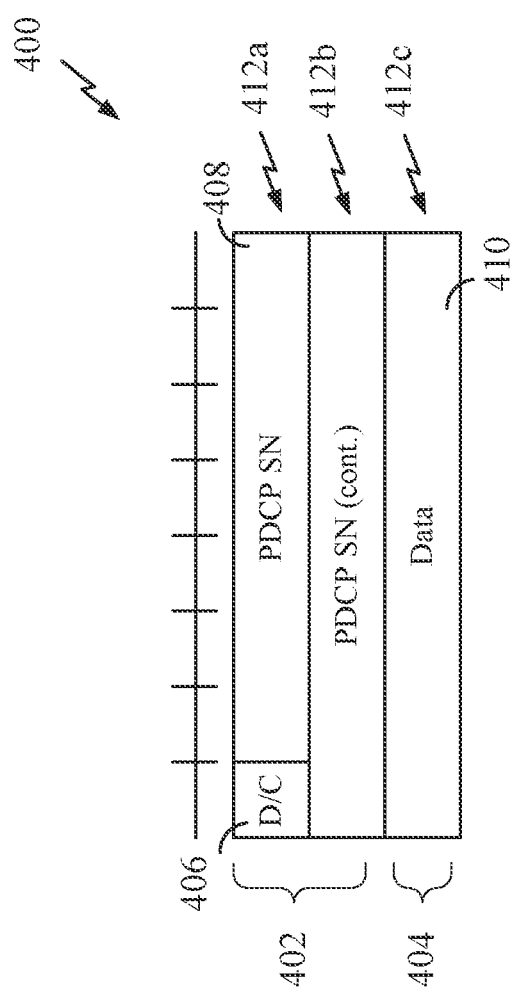

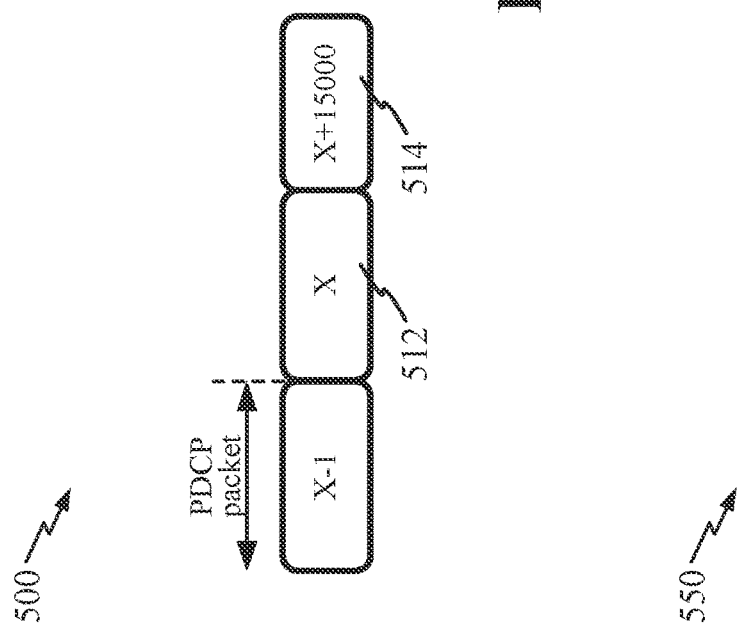
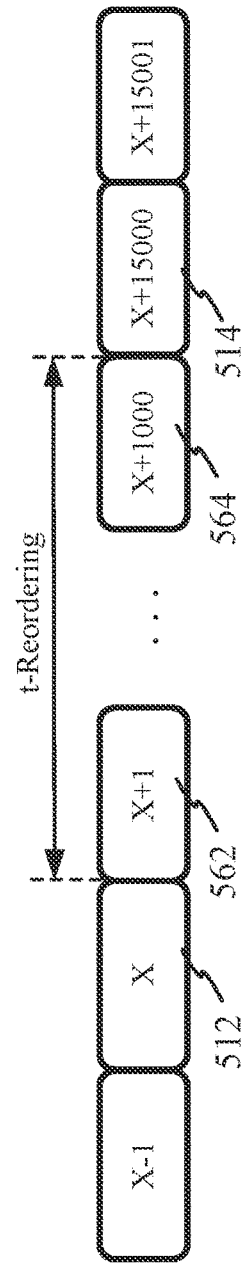
FIG. 5A
FIG. 5B

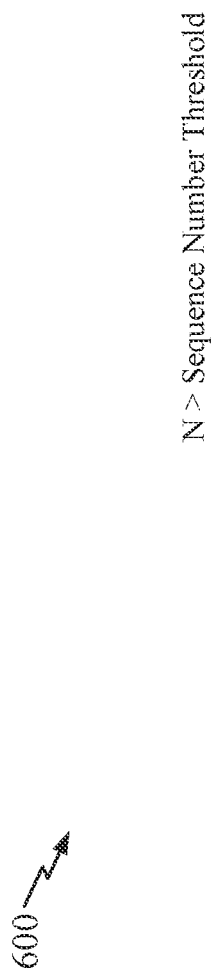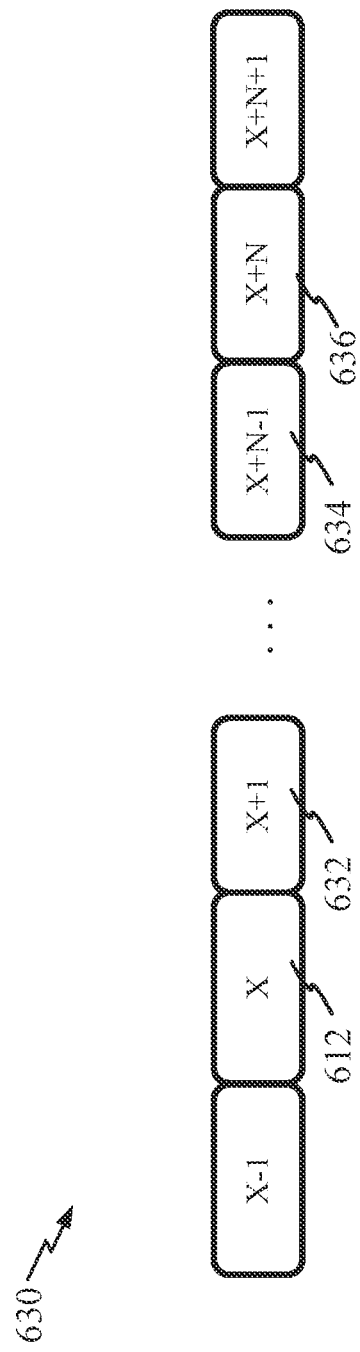

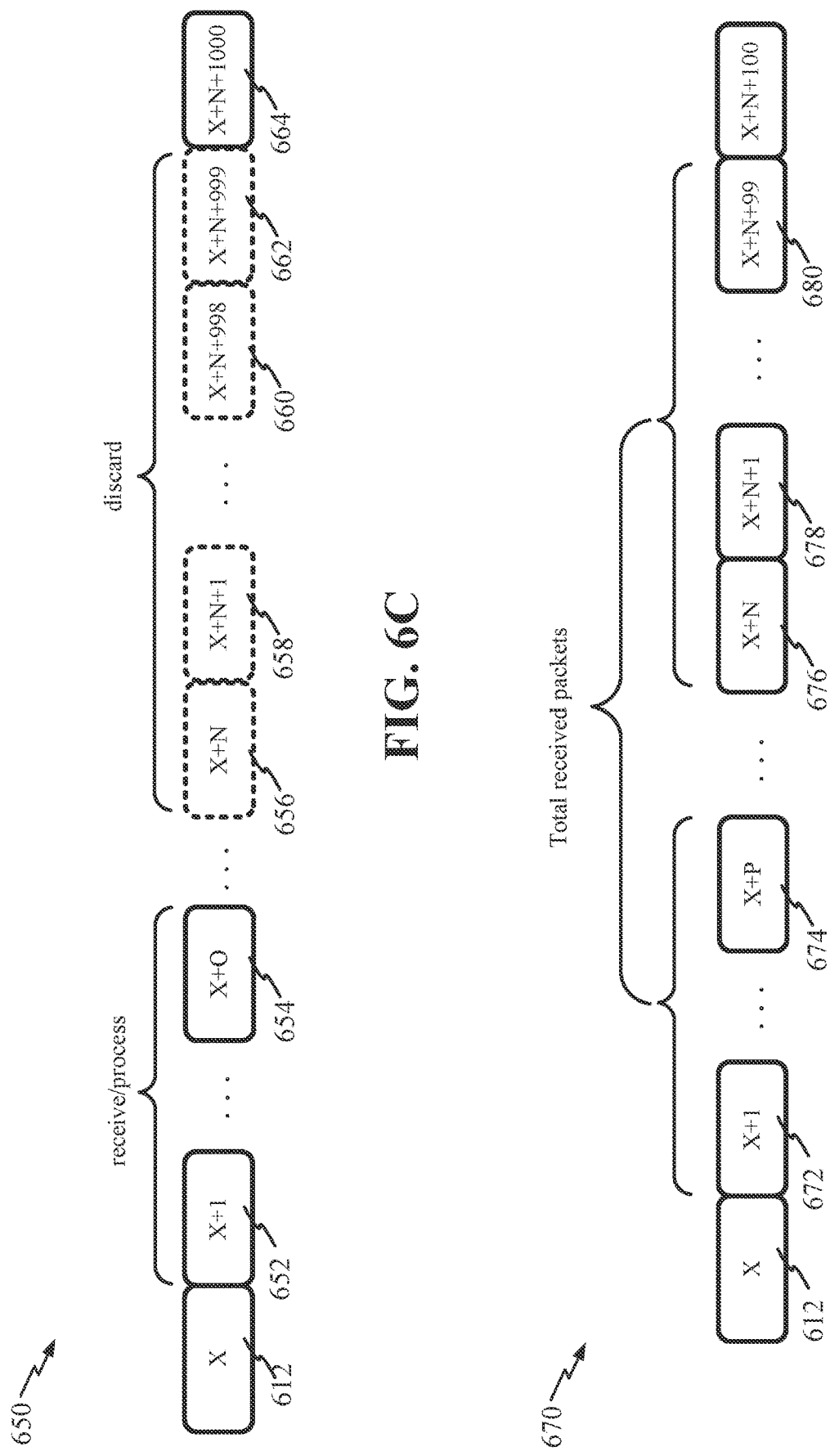

DOWNLINK DATA STALL OPTIMIZATION BY ADDRESSING AN OUT-OF-ORDER PACKET SEQUENCE

PRIORITY CLAIM

This application for patent is a U.S. National Stage entry of International Patent Application No. PCT/CN2021/106852 filed 16 Jul. 2021, which claims priority to and the benefit of Indian patent application Ser. No. 20/204,1030553 filed in the Indian Patent Office (The Office of the Controller General of Patents, Designs and Trade Marks) on Jul. 17, 2020, the entire contents of which is incorporated herein by reference as if fully set forth below in its entirety and for all applicable purposes.

TECHNICAL FIELD

The technology discussed below relates generally to wireless communication systems, and more particularly, to processing of packets associated with sequence numbers, such as packet data convergence protocol (PDCP) packets.

INTRODUCTION

In 3rd Generation Partnership Project (3GPP) standards, the Packet Data Convergence Protocol (PDCP) sublayer is located in the radio protocol stack in both the Long Term Evolution (LTE) and New Radio (NR) air interface on top of the Radio Link Control (RLC) sublayer. The PDCP sublayer provides various services, such as transfer of user and control plane data, header compression/decompression, ciphering, deciphering, and integrity protection. The RLC sublayer provides segmentation and reassembly of upper layer data packets, unpacking lower layer data packets, retransmission of lost data packets. Further, the PDCP sublayer in NR communication or the RLC sublayer in LTE communication may provide reordering of data packets to compensate for out-of-order reception due to hybrid automatic repeat request (HARQ) and automatic repeat request (ARQ).

The PDCP sublayer may receive packets such as PDCP packets that are associated with sequences form an RLC sublayer. However, the packets may be received out-of-order in sequence due to various factors. Although an approach to address the out-of-order sequence of the received packets has been developed, optimization of such an approach is desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to addressing issues related to packets received out-of-order in sequence. If first and second packets are consecutively received and there is a large difference in the sequence numbers of these two packets, the second packet may be disregarded from processing and missing packets between the first and second packets are received. Because this approach may not be restricted by a reordering timer when the difference in the sequence numbers of the two packets is large, there is a greater chance to retrieve and process all or most of the missing packets between the first and second packets.

In one example, a method of packet processing by a user equipment (UE) is disclosed. The method includes determining whether a difference between a sequence number of a first packet and a sequence number of a second packet received subsequent to receiving the first packet exceeds a sequence jump threshold, disregarding the second packet from processing in response to at least determining that the difference is greater than the sequence jump threshold, and receiving and processing a plurality of packets respectively associated with a plurality of sequence numbers that are greater than the sequence number of the first packet and less than the sequence number of the second packet.

In another example, a UE for packet processing is disclosed. The UE includes at least one processor, a transceiver communicatively coupled to the at least one processor, and a memory communicatively coupled to the at least one processor. The at least one processor is configured to determine whether a difference between a sequence number of a first packet and a sequence number of a second packet received subsequent to receiving the first packet exceeds a sequence jump threshold, disregard the second packet from processing in response to at least determining that the difference is greater than the sequence jump threshold, and receive and process a plurality of packets respectively associated with a plurality of sequence numbers that are greater than the sequence number of the first packet and less than the sequence number of the second packet.

In another example, a non-transitory processor-readable storage medium having instructions thereon for a UE is disclosed. The instructions, when executed by a processing circuit, cause the processing circuit to determine whether a difference between a sequence number of a first packet and a sequence number of a second packet received subsequent to receiving the first packet exceeds a sequence jump threshold, disregard the second packet from processing in response to at least determining that the difference is greater than the sequence jump threshold, and receive and process a plurality of packets respectively associated with a plurality of sequence numbers that are greater than the sequence number of the first packet and less than the sequence number of the second packet.

In a further example, a UE for packet processing is disclosed. The UE includes means for means for determining whether a difference between a sequence number of a first packet and a sequence number of a second packet received subsequent to receiving the first packet exceeds a sequence jump threshold, means for disregarding the second packet from processing in response to at least determining that the difference is greater than the sequence jump threshold, and means for receiving and processing a plurality of packets respectively associated with a plurality of sequence numbers that are greater than the sequence number of the first packet and less than the sequence number of the second packet.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 is a diagram illustrating an example of a format of a Packet Data Convergence Protocol (PDCP) Packet Data Unit (PDU).

FIGS. 5A and 5B illustrate example diagrams of a PDCP sequence number jump that triggers a reordering timer to receive missing packets.

FIGS. 6A-6D illustrate example diagrams of a PDCP sequence number jump that triggers disregarding of a packet to receive missing packets, according to some aspects of the disclosure.

DETAILED DESCRIPTION

Figure 1:
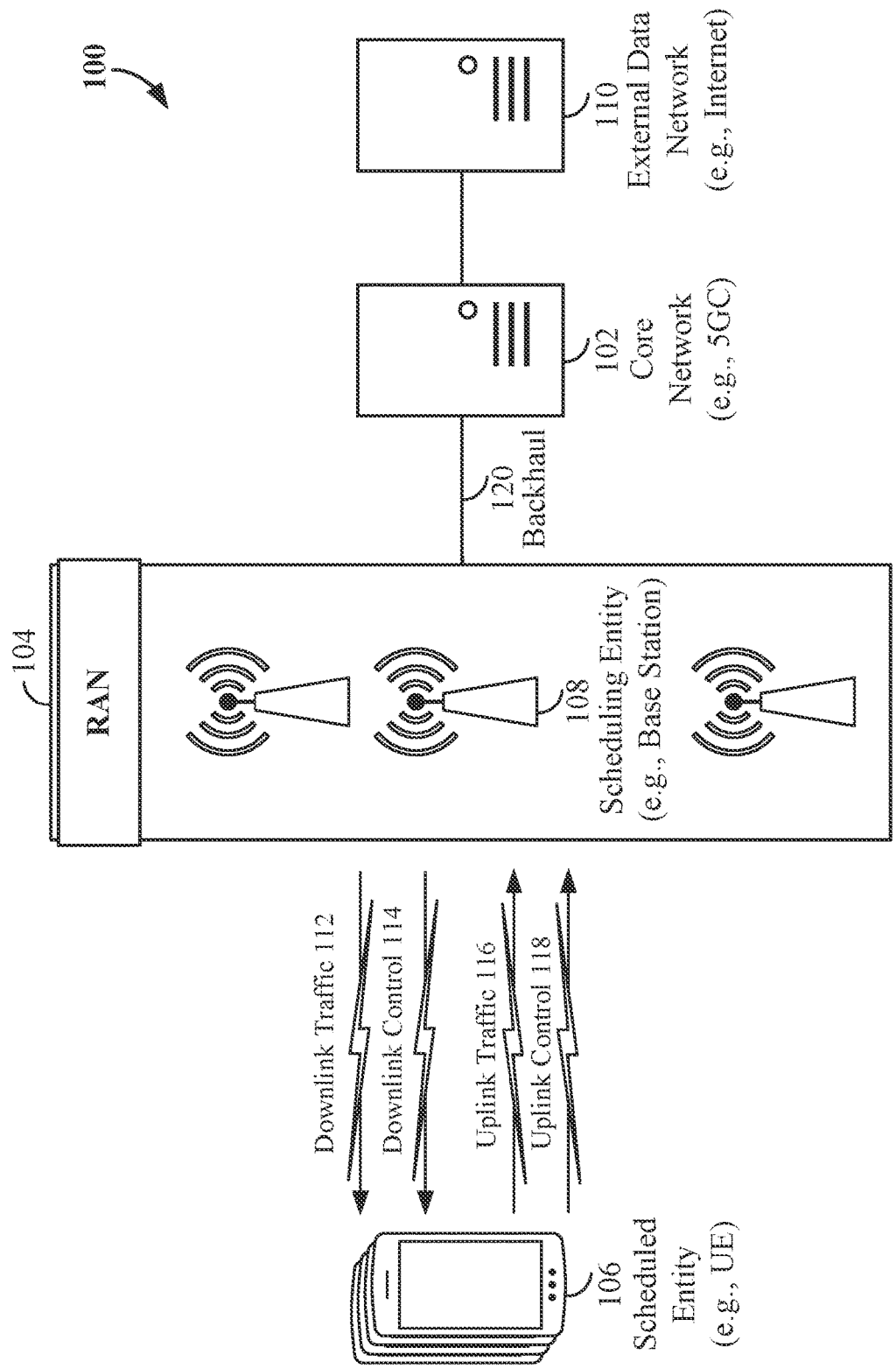
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or Original Equipment Manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

To achieve reliable results, received packets that are associated with respective sequence numbers should have consecutive sequence numbers, e.g., without skipping a sequence number between packets. However, there may be a case where one or more packets may not be received and/or processed. In such a case, when a first packet and a second packet are consecutively received, a sequence number of the first packet and a sequence number of the second packet may not be consecutive numbers, if there are missing packets between the first and second packets. For example, the sequence number of the second packet may be much greater than the sequence number of the first packet. In this case, a reordering timer is triggered to attempt to receive and process the missing packets whose sequence numbers are greater than the sequence number of the first packet and less than the sequence number of the second packet. However, if the reordering timer expires before all of the missing packets are received and processed, one or more missing packets that are not received and processed may be discarded and may not be recovered, which causes a data stall.

According to some aspects of the disclosure, if a difference between the sequence number of the first packet and the sequence number of the second packet is greater than a certain threshold, the UE may disregard the second packet from processing and may receive the missing packets whose sequence numbers are greater than the sequence number of the first packet and less than the sequence number of the second packet. In this case, because the UE may receive the missing packets without being restricted by the reordering timer, there is a greater chance for the UE to retrieve all or most of the missing packets. The second packet may be disregarded at least until one or more of the plurality of packets are received and processed.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
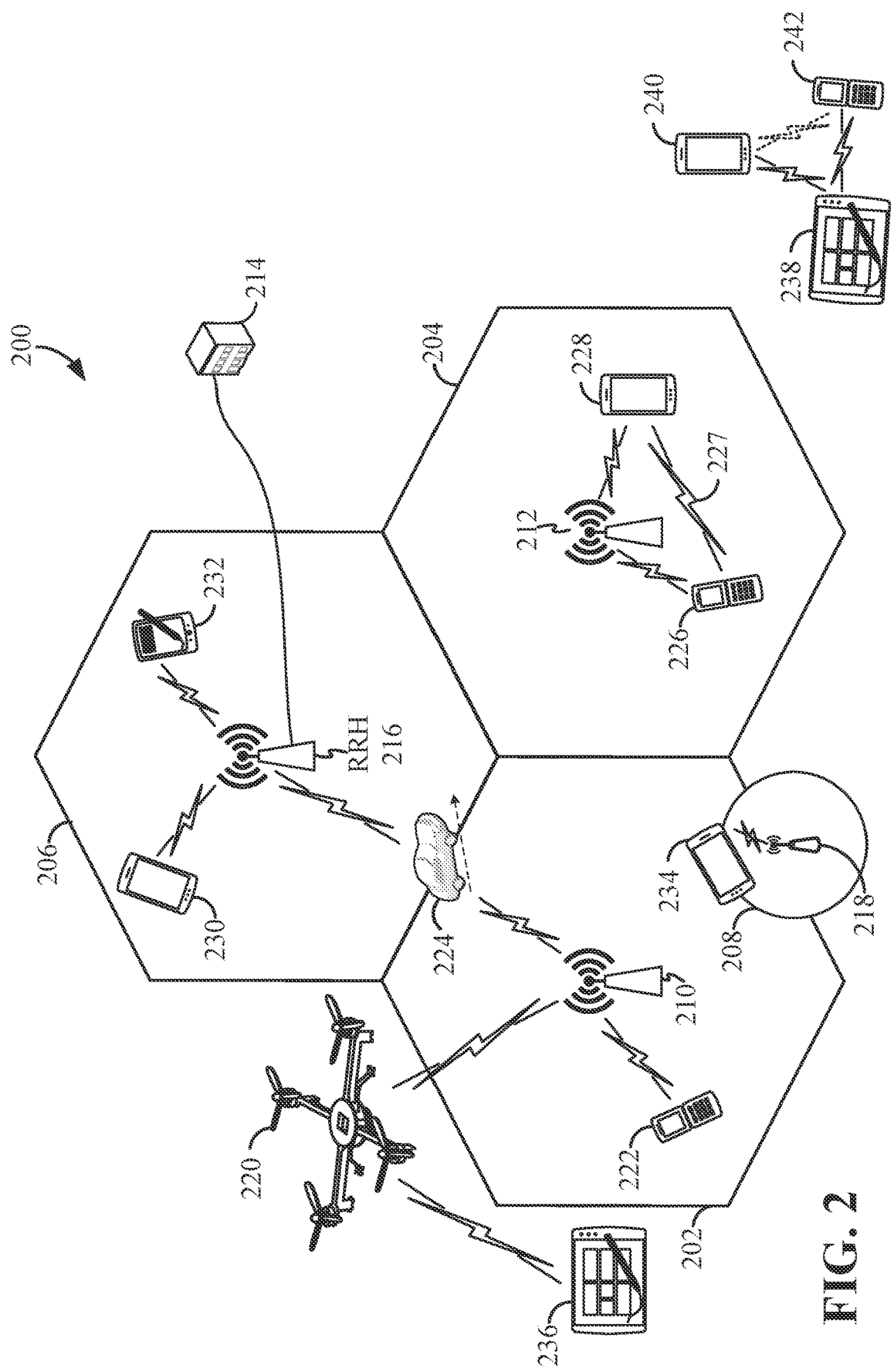
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
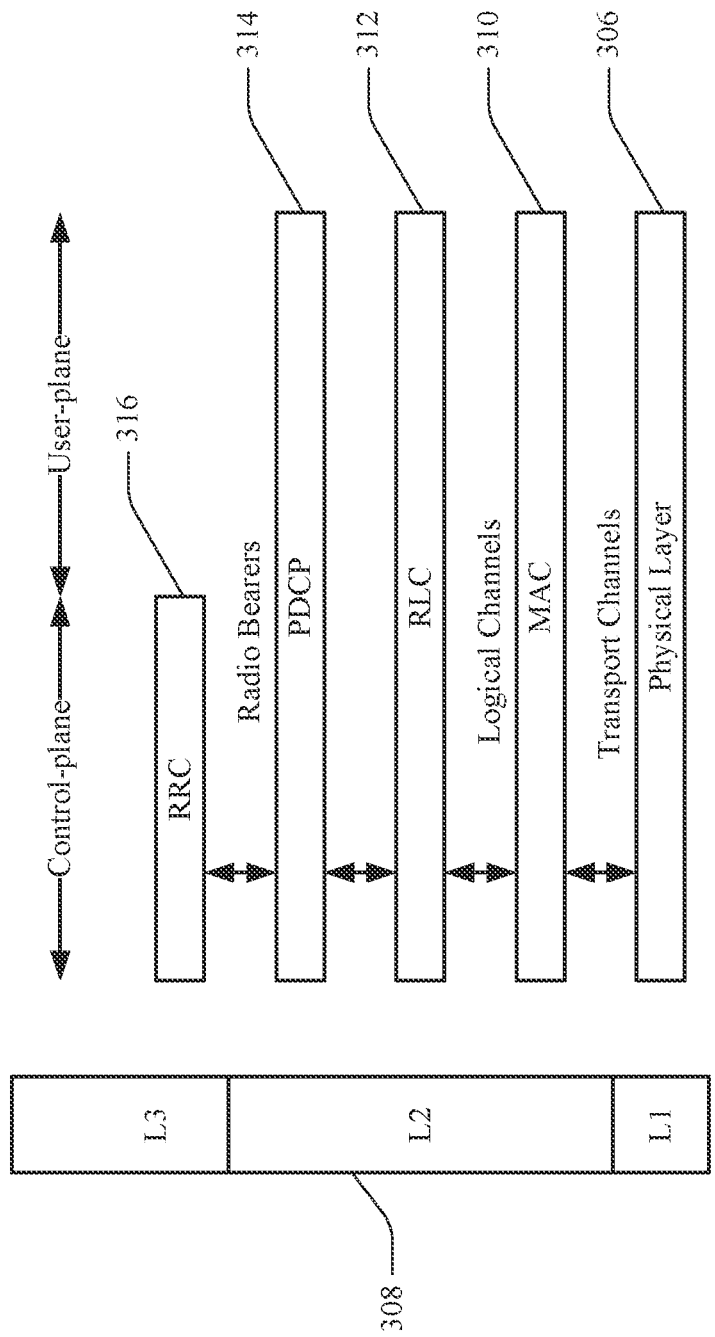
FIG. 3 is a diagram illustrating an example of a radio protocol architecture for the user and control plane.

The radio protocol architecture for a radio access network, such as the radio access network 104 shown in FIG. 1 and/or the radio access network 200 shown in FIG. 2, may take on various forms depending on the particular application. An example for an LTE or NR radio access network will now be presented with reference to FIG. 3. FIG. 3 is a conceptual diagram illustrating an example of the radio protocol architecture for the user and control planes.

As illustrated in FIG. 3, the radio protocol architecture for the UE and the base station includes three layers: Layer 1, Layer 2, and Layer 3. Layer 1 is the lowest layer and implements various physical layer signal processing functions. Layer 1 will be referred to herein as the physical layer 306. Layer 2 (L2 layer) 308 is above the physical layer 306 and is responsible for the link between the UE and base station over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the base station on the network side. Although not shown, the UE may have several upper layers above the L2 layer 308 including a network layer (e.g., internet protocol (IP) layer) that is terminated at the Packet Data Network (PDN) gateway on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead and/or header decompression for lower layer data packets received, security by ciphering/deciphering the data packets, sequence numbering, and handover support for UEs between base stations. The RLC sublayer 312 provides segmentation and reassembly of upper layer data packets and/or unpacking lower layer data packets, retransmission of lost data packets. Further, the PDCP sublayer 314 in NR communication or the RLC sublayer 312 in LTE communication may provide reordering of data packets to compensate for out-of-order reception due to hybrid automatic repeat request (HARQ) and automatic repeat request (ARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. The physical layer 306 is responsible for transmitting and receiving data on physical channels (e.g., within slots).

In the control plane, the radio protocol architecture for the UE and base station is substantially the same for the physical layer 306 and the L2 layer 308 with the exception that there is no header compression function for the control plane. The control plane also includes a radio resource control (RRC) sublayer 316 in Layer 3. The RRC sublayer 316 is responsible for obtaining radio resources (i.e., radio bearers) and for configuring the lower layers using RRC signaling between the base station and the UE.

To transmit data, the data travels from an upper layer to a lower layer and is transmitted via the physical layer 306. For example, the PDCP sublayer 314 may generate a PDCP packet data unit (PDU) based on a PDCP service data unit (SDU) received from an upper layer and transmit the PDCP PDU to the RLC sublayer 312. The RLC sublayer 312 may generate an RLC PDU based on the PDCP PDU or an RLC SDU received from the PDCP sublayer 314 and transmit the RLC PDU to the MAC sublayer 310. The MAC sublayer 310 may generates a MAC PDU based on the RLC PDU or a MAC SDU received from the RLC sublayer 312 and transmit the MAC PDU to the physical layer 306. The physical layer 306 may be used to transmit data based on the MAC PDU to a receiving apparatus.

When data is received via the physical layer 306, the data travels from a lower layer to an upper layer. For example, the physical layer 306 may generate a transport block from the received data signal and transmit the transport bock to the MAC sublayer 310. The MAC sublayer 310 may generate an MAC SDU based on the transport block or a MAC PDU received from the physical layer 306 and transmit the MAC SDU to the RLC sublayer 312. The RLC sublayer 312 may generate an RLC SDU based on the MAC SDU or an RLC PDU received from the MAC sublayer 310 and transmit the RLC SDU to the PDCP sublayer 314. The PDCP sublayer 314 may generate a PDCP SDU based on the RLC SDU or a PDCP PDU received from the RLC sublayer 312 and transmit the PDCP SDU to the RRC sublayer 316.

An example of a PDCP packet data unit (PDU) format is illustrated in FIG. 4. The PDCP PDU format 400 includes a header 402 and body 404. The header 402 includes a D/C field 406 and SN field 408. The D/C field 406 is located within a first octet 412a and may include, for example, a single bit for indicating whether the PCDP PDU contains user plane data or control plane data. In the example shown in FIG. 4, the SN field 408 occupies the remainder of the first octet 412a, along with a second octet 412b. The SN field 408 contains the sequence number (SN) of the PDCP PDU. In some examples, the SN may contain 7 bits or 12 bits or 18 bits. The body 404 contains uncompressed or compressed user or control plane data 410 and may include one or more octets (only one octet 412c of which is shown for simplicity).

In order to process PDCP packets correctly (e.g., from an RLC sublayer), the PDCP packets should be received without missing a PDCP packet, which may be indicated by consecutive sequence numbers associated with the PDCP packets. As PDCP packets (e.g., PDCP PDUs) are received, the PDCP packets are processed (e.g., at a PDCP sublayer) and sent to an upper layer to be used by an application. When a PDCP sublayer receives a PDCP packet from an RLC sublayer, one or more PDCP packets may be received out-of-order in sequence, which may be observed based on the sequence numbers the PDCP packets that are out of order. For example, for two packets received consecutively, when a first PDCP packet is receive and subsequently a second PDCP packet is received, a sequence number of the second PDCP packet may be higher than a sequence number expected subsequent to a sequence number of the first PDCP packet. In an example, the first PDCP packet may have a sequence number of X and the second PDCP packet received immediately after the first PDCP packet may have a sequence number of X+15000, although the expected sequence number for a packet received immediately after the first PDCP packet is X+1. This may occur when one or more packets respectively corresponding to one or more sequence numbers after the sequence number of the first PDCP packet before the sequence number of the second PDCP packet are not received. This jump in the sequence number between two PDCP packets that are consecutively received may also be referred to as a PDCP SN jump or, more generally, a packet SN jump.

The PDCP SN jump may occur when there is a handover or any other type of cell change from a source cell to a target cell. For example, the PDCP SN jump may occur between a last packet received before the handover and a first packet received after the handover. The PDCP SN jump may occur within the first 10,000 packets sent on a re-established RLC sublayer, and may be as high as 10,000. Thus, in one example, a last PDCP packet received before a handover may have a sequence number of X and a first PDCP packet received after the handover may have a sequence number of X+10,000.

The PDCP SN jump may cause the UE to start a reordering timer (e.g., t-Reordering) for the missing packets between the first and second packets where the PDCP SN jump occurs. For example, during the reordering timer, the UE may receive the missing packets having the sequence numbers greater than the sequence number of the first packet and less than the sequence number of the second packet where the PDCP SN jump occurs. In an example, the reordering timer may be configured by a network and signaled to the UE (e.g., via RRC signaling). For example, the reordering time may be configured as a time to allow a HARQ and/or an RRC to recover. Upon expiry of the reordering timer, even if not all of missing packets have been received, a reception window indicating a range of sequences for receiving packets may move to a higher sequence number range to receive a packet with a higher sequence number and thus the UE may discard all incoming packets with sequence numbers less than the sequence number of the second packet as Out Of Window (OOW). For example, there may be no recovery mechanism for these discarded missing packets because the currently-available recovery mechanism is associated with physical layer issues and/or an RLC issues that are radio link failure issues and the discarded missing packets are not caused by a radio link failure. Because at least some of the missing packets are discarded (e.g., thus are not processed) and no recovery mechanism is available for the discarded missing packets, to a data stall at the PDCP sublayer may occur due to the discarding of the missing packets not received due to the expiry of the reordering timer. Therefore, an approach to eliminate or reduce the data stall due to the discarding of the missing packets due to the expiry of the reordering timer is desired.

FIGS. 5A and 5B illustrate example diagrams of a PDCP SN jump that triggers a reordering timer to receive missing packets. As illustrated in the example diagram 500 of FIG. 5A, a first PDCP packet 512 has a sequence number X and a second PDCP packet 514 has a sequence number X+15, 000, and thus there is a PDCP SN jump of 15,000. The first PDCP packet 512 may be the last packet received before a handover to a target cell. When the first PDCP packet 512 is received, the UE may initially set RX_NEXT (e.g., next expected SN) to be X+1 and set RX_DELIV (e.g., next SN to be delivered) to X+1. When the second PDCP packet 514 with the sequence number of 15,000 is received, the UE may change RX_NEXT to be X+15,001, start a reordering timer (e.g., t-Reordering), and set RX_REORD (e.g., reordering variable) to be X+15,001. In an example, the reordering timer may be 300 msec.

As shown in the example diagram 550 of FIG. 5B, with the reordering time triggered, the missing PDCP packets after the first PDCP packet 512 and before the second PDCP packet 514 are received and processed. Thus, missing PDCP packets starting with a missing PDCP packet 562 with a sequence number of X+1 are received and processed during the reordering timer. However, in the example diagram 550 of FIG. 5B, the reordering time expires before all of the missing PDCP packets are received and thus a last missing PDCP packet received and processed before the expiry of the reordering timer is a missing PDCP packet 564 with a sequence number of X+1000. At this point, for example, RX_DELIV may be set to X+1001 while RX_NEXT remains as X+15,001. Upon the expiry of the reordering timer, the second PDCP packet 514 is processed and RX_DELIV may be set to X+15,001, and thus the reception window has moved to a higher sequence range greater than 15,000. Then, the PDCP packets with the sequence numbers greater than 15,000 are received and processed. Because the reordering timer expires soon after receiving the missing PDCP packet 564, the rest of the missing PDCP packets with the sequence numbers greater than X+1000 and less than X+15,000 are discarded as OOW, e.g., because such sequence numbers are smaller than RX_DELIV of X+15,001.

According to some aspects of the disclosure, when a first and second packets are received consecutively and the second packet received subsequent to the first packet has a sequence number that is out-of-order in sequence (e.g. due to a packet SN jump such as a PDCP SN jump), if a difference between the sequence number of the first packet and the sequence number of the second packet is greater than a sequence jump threshold (e.g., 10,000), a UE (e.g., UE of FIGS. 1 and/or 2) may disregard the second packet from processing and may receive/process missing packets whose sequence numbers are greater than the sequence number of the first packet and less than the sequence number of the second packet. For example, when the UE disregards a packet from processing, the UE may not process the packet, even if the packet has been received by the UE. Hence, for example, disregarding a packet by the UE may involve storing the packet without processing the packet or discarding the packet. The second packet (e.g., and packets with higher sequence numbers than the second packet) may be disregarded at least until all of such missing packets are received and/or processed. As such, for example, if the packet SN jump is too high (e.g., greater than the sequence jump threshold), the reordering timer may not be long enough to allow recovery of all of the missing packets and thus end up discarding some of the missing packets that are not received and/or processed before the expiry of the reordering timer. Hence, by disregarding the second packet (e.g., and packets with higher sequence numbers than the second packet) if the difference between the sequence number of the first packet and the sequence number of the second packet is greater than the sequence jump threshold, all of the missing packets may be received and processed without the restriction placed by the reordering timer, thereby preventing or reducing a data stall caused by missing packets not received/processed. In an aspect, the second packet received subsequent to the first packet may be a packet received consecutively after receiving the first packet (e.g., immediately after receiving the first packet).

In an aspect, the sequence jump threshold may be based on a maximum possible number of packets that can be received during a reordering timer. For example, the UE may determine a maximum number of packets that the UE can receive during a reordering timer, and determine the sequence jump threshold based on this maximum number of packets. For example, the UE may determine that sequence jump threshold is equal to the maximum number of packets that the UE can receive during the reordering timer. The number of missing packets may be reflected by the difference between the sequence number of the first packet and the sequence number of the second packet. Thus, for example, if the number of missing packets is less than or equal to the maximum number of packets that can be received during the reordering timer, the reordering timer may be used to receive the missing packets. Otherwise, the second packet may be disregarded to start receiving the missing packets.

In an aspect, the sequence jump threshold may be based on a number of bits allocated to indicate a sequence number of a packet. For example, the sequence jump threshold may be set to 2000 if a number of bits allocated to indicate a sequence number is 12 bits. In another example, the sequence jump threshold may be set to 10000 if a number of bits allocated to indicate a sequence number is 18 bits. Hence, for example, for a higher number of bits allocated to indicate a sequence number, the sequence jump threshold may be greater. This may be because more bits may allow a greater range and a higher number of sequence numbers.

In an aspect, the packets may be PDCP packets (e.g., PDCP PDUs) and may be received (e.g., from an RLC sublayer) and/or processed at a PDCP sublayer of a UE, such that the processed packets can be forwarded for use by an application. Hence, in an aspect, the first packet may be a first PDCP packet, the second packet is a second PDCP packet, and the missing packets may be missing PDCP packets, where these PDCP packets may be received from one or more RLC sublayers and processed by the PDCP sublayer of the UE. In an aspect, these PDCP packets may be received from a single RLC sublayer. In an example where the UE implements dual connectivity, the UE may be configured to utilize resources from two different nodes, where one node may provide NR access and the other node may provide either eUTRAN or NR access. Examples of the dual connectivity may include an eUTRAN-NR dual connectivity (EN-DC) where the UE is capable of simultaneously connecting to an LTE base station and a NR base station, a NR-eUTRAN dual connectivity (NE-DC) where the UE is capable of simultaneously connecting to an NR base station and an LTE base station, and a new radio dual connectivity (NR-DC) where the UE is capable of simultaneously connecting to two NR base stations. Hence, in an aspect, in the example of the UE with the dual connectivity, these PDCP packets may be received from two different RLC sublayers. In an example scenario where the sequence number of the first packet is X and the sequence number of the second packet is X+N, if N is greater than the sequence jump threshold, the UE may receive and/or process (e.g., at the PDCP sublayer) the missing packets whose sequence numbers are greater than X and less than X+N.

In an aspect, the packets may be RLC packets (e.g., RLC PDUs) and may be received (e.g., from a MAC sublayer) and/or processed at an RLC sublayer of a UE, such that the processed packets can be forwarded for use by an application. Hence, in an aspect, the first packet may be a first RLC packet, the second packet is a second RLC packet, and the missing packets may be missing RLC packets, where these RLC packets may be received from a MAC sublayer and processed by the RLC sublayer of the UE.

Further, as discussed above, the packet SN jump may occur during a cell change (e.g., handover) that has caused the UE to switch to a current cell/base station utilized by the UE. For example, the cell change may be due to a handover from a source cell/base station to the current cell/base station, or may be due to a radio link failure that has caused the UE to re-establish a radio link by changing to the current cell/base station. Hence, in an aspect, the first packet may be a last packet received prior to the cell change to the current base station utilized by the UE and the second packet may be a packet received first after the cell change to the current base station. In an example where the cell change is a handover, the handover may be any type of handover, such as a non-standalone (NSA) handover, a standalone (SA) handover, and an LTE handover.

In an aspect, the UE may disregard the second packet from processing if the difference between the sequence number of the first packet and the sequence number of the second packet is greater than the sequence jump threshold and if a number of packets received after a cell change (e.g., handover) that has caused the UE to switch to a current base station and prior to receiving the second packet is less than or equal to a post-cell-change received packet threshold (e.g., 10,000). The post-cell-change received packet threshold may represent a maximum number of packets received after the cell change for disregarding the second packet. Thus, for example, in a case where the post-cell-change received packet threshold is M, the second packet may be disregarded if a packet SN jump between the first packet and the second packet is greater than the sequence jump threshold and additionally if the packet SN jump occurs within the first M packets received after the cell change. For example, in a case where the post-cell-change received packet threshold is M, if a packet SN jump occurs for packets received after receiving M packets after the cell change, the second packet may not be disregarded and the UE may rely on a reordering timer to attempt to receive and/or process all or at least some of the missing packets while the reordering timer is activated.

In an aspect, if the difference between the sequence number of the first packet and the sequence number of the second packet is less than or equal to the sequence jump threshold, the UE may activate a reordering timer and attempt to receive and/or process all or at least some of the missing packets with sequence numbers that are greater than the sequence number of the first packet and less than the sequence number of the second packet, while the reordering timer is activated. Hence, in this aspect, while the reordering timer is activated, some or all of the missing packets with sequence numbers that are greater than the sequence number of the first packet and less than the sequence number of the second packet may be received by the UE. When the reordering timer expires, the UE may discard any of the missing packets with sequence numbers that are greater than the sequence number of the first packet and less than the sequence number of the second packet that are not yet received and/or processed. Hence, for example, if the packet SN jump is not too high (e.g., not greater than the sequence jump threshold) for attempting to receive the missing packets, the UE may rely on the reordering timer to attempt to receive and/or process all or at least some of the missing packets.

In an aspect, the UE may disregard the second packet from processing by maintaining the second packet in a storage portion without processing until all of the missing packets are received and processed. In the above example scenario, if the second packet with the sequence number of X+N is not discarded but is maintained in a separate storage, RX_NEXT may be kept as X+N+1, such that the second packet with the sequence number of X+N may be kept for processing later. Hence, in this example, because the second packet with the sequence number of X+N is not processed until the missing packets are received and processed, the reception window is set to be a sequence range greater than X (e.g., starting from X+1).

In an aspect, the UE may disregard the second packet from processing by discarding the second packet if the difference between the sequence number of the first packet and the sequence number of the second packet is greater than the sequence jump threshold. In an aspect, the UE may receive and process a packet with the sequence number of the second packet after all of the missing packets are received and processed. For example, after discarding the second packet, the UE may receive and process the missing packets with sequence numbers that are greater than the sequence number of the first packet and less than the sequence number of the second packet, and then subsequently receive and process a packet with the sequence number of the second packet. In the above example scenario, if the second packet with the sequence number of X+N is discarded, RX_NEXT may be changed from X+N+1 to X+1, which changes the reception window to a lower sequence number range starting from X+1. Thus, in this example, after the missing packets with sequence numbers greater than X and less than X+N are received and processed, a new packet corresponding to X+N is received and processed.

In an aspect, the UE may determine/count a number of discarded packets, where each discarded packet is discarded for having a sequence number that is greater than a sequence number of a previously received packet (e.g., first packet) at least by the sequence jump threshold, and then may determine whether the number of discarded packets is less than a discard threshold (e.g., 1000 packets). In particular, if the difference between the sequence number of the first packet and the sequence number of the second packet is greater than the sequence jump threshold, the UE may discard the second packet and may also discard one or more packets each having a respective sequence number greater than the sequence number of the second packet. Then, the UE may determine whether a number of discarded packets including the discarded second packet and the one or more discarded packets is less than a discard threshold. In an aspect, these discarded packets may be packets discarded subsequent to a cell change (e.g. handover) to a current base station utilized by the UE. In this case where the difference between the sequence number of the first packet and the sequence number of the second packet is greater than the sequence jump threshold, if the UE determines that the number of discarded packets is less than a discard threshold, the UE may discard at least one additional packet each having a respective sequence number greater than sequence numbers of the discarded packets. On the other hand, in an aspect, if the UE determines that the number of discarded packets is greater than or equal to the discard threshold, the UE may receive and process the at least one additional packet each having the respective sequence number greater than sequence numbers of the discarded packets.

Hence, for example, if a packet SN jump is detected and the number of the discarded packets that are previously discarded due to PDCP SN jumps is less than the discard threshold, packets associated with the packet SN jump such as the second packet and packet(s) each with a higher sequence number than that of the second packet may be discarded, while the missing packets may be received and processed. On the other hand, for example, if a packet SN jump is detected and the number of the discarded packets that are previously discarded due to PDCP SN jumps exceeds the discard threshold, then the UE may not discard or disregard the packets associated with the packet SN jump and may rely on a reordering timer to attempt to receive and/or process all or at least some of the missing packets while the reordering timer is activated. For example, the number of the discarded packets (e.g., including the second packet and packet(s) each with a higher sequence number than that of the second packet) may increase over time and may exceed the discard threshold, as more packets are received and processed and a sequence number of each packet received and processed increases. Thus, in an example, if the number of the discarded packets exceeds the discard threshold, the next packets being received and processed may have sequence numbers corresponding to sequence numbers of packets received after a cell change (e.g., handover) to the current base station, which may indicate that the missing packets due to the packet SN jump during the cell change have been received and processed and thus discarding of a packet is not necessary.

In addition to checking if the number of the discarded packets is less than the discard threshold, the UE may further check if missing packets are still being received after some time, and consider the number of missing packets being received. In an aspect, in addition to determining whether the number of discarded packets is less than a discard threshold, the UE may further determine whether a number of the missing packets received is greater than a received packet threshold. In this aspect, in a case where the difference between the sequence number of the first packet and the sequence number of the second packet is greater than the sequence jump threshold, if the number of the discarded packets including the discarded second packet and the one or more discarded packets is less than the discard threshold and if the number of missing packets received is greater than the received packet threshold, then the UE may discard the at least one additional packet each having the respective sequence number greater than sequence numbers of the discarded packets. On the other hand, if the number of the discarded packets including the discarded second packet and the one or more discarded packets is greater than or equal to the discard threshold and/or if the number of missing packets received is less than or equal to the received packet threshold, the UE may receive and process the at least one additional packet each having the respective sequence number greater than sequence numbers of the discarded packets. For example, in this case, if a number of missing packets received (e.g., during a particular time period T) is greater than the received packet threshold, then the missing packets are still being received and thus packets associated with the packet SN jump may be discarded when the number of discarded packets is less than the discard threshold.

In an aspect, the UE may activate a packet count timer when the UE receives the second packet. While the packet count timer is activated, the UE may receive post-jump packets having respective sequence numbers greater than or equal to the sequence number of the second packet until the packet count timer expires and/or a number of the plurality of post-jump packets reaches a second received packet threshold. That is, when the packet count timer expires and/or a number of the post-jump packets reaches a second received packet threshold, the UE may stop receiving post-jump packets. In an aspect, the packet count timer and the second received packet threshold may be configurable and may indicate an amount of post-jump packets that the UE is capable of storing before processing them. Hence, in an aspect, the packet count timer and/or the second received packet threshold may be configured based on a storage space in the UE to store the post-jump packets.

Subsequently, the UE may determine a number of valid post-jump packets among the post-jump packets received by the UE while the packet count timer is activated and/or before the number of the post-jump packets reaches the second received packet threshold. To determine whether a packet is a valid packet or not, the UE may decipher the packet to determine a location of a header of the packet, and then check contents of the header of the packet to determine whether the packet is a valid packet. For example, if the field in the header of the packet contains known/valid header information and/or format, then the packet is a valid packet. Otherwise, the packet may not be a valid packet. Hence, in an aspect, the UE may determine whether each of the post-jump packets is valid based on a header of a respective post-jump packet of the post-jump packets after deciphering the respective post-jump packet.

The UE may determine whether a ratio of the number of valid post jump packets to a total number of packets received by the UE exceeds a valid packet ratio threshold, where the total number of packets received by the UE is a number of packets received by the UE until the packet count timer expires and/or the number of the post-jump packets reaches the second received packet threshold. If the UE determines that the ratio of the number of valid post-jump packets to the total number of packets received by the UE exceeds the valid packet ratio threshold, the UE may process the post-jump packets and may not discard or disregard the post-jump packets. In this case, for example, the UE may receive and process any packets whose respective sequence numbers are greater than or equal to the sequence number of the second packet. On the other hand, if the UE determines that the ratio of the number of valid post-jump packets to the total number of packets received by the UE does not exceed the valid packet ratio threshold, the UE may discard the post-jump packets. In this case, for example, the UE may receive and process packets whose respective sequence numbers are greater than or equal to the sequence number of the first packet but lower than the sequence number of second packet.

In an example where the valid packet ratio threshold is 80%, the UE may check if a number of valid post-jump packets with respective sequence numbers greater than or equal to the sequence number of the second packet is greater than 80% of a number of the total packets received before the packet count timer expires and/or the number of the post-jump packets reaches the second received packet threshold. If the number of the valid post-jump packets with respective sequence numbers greater than or equal to the sequence number of the second packet is greater than 80% of the number of the total packets, then the UE may process the post-jump packets. Otherwise, the UE may discard the post-jump packets.

FIGS. 6A-6D illustrate example diagrams of a PDCP SN jump that triggers disregarding of a packet to receive missing packets, according to some aspects of the disclosure. As illustrated in the example diagram 600 of FIG. 6A, a first PDCP packet 612 has a sequence number X and a second PDCP packet 614 has a sequence number X+N, and thus there is a PDCP SN jump of N. The first PDCP packet 612 may be the last packet received before a cell change (e.g., handover) to a target cell. When the first PDCP packet 612 is received, the UE may initially set RX_NEXT (e.g., next expected SN) to be X+1 and set RX_DELIV (e.g., next SN to be delivered) to X+1. When the second PDCP packet 614 with the sequence number of N is received, the UE may change RX_NEXT to be X+N+1. If the UE determines that the difference between the sequence number of the first PDCP packet 612 and the sequence number of the second PDCP packet 614 is N and exceeds a sequence jump threshold of 10,000, the UE may disregard the second PDCP packet 614 from processing. If the UE discards the second PDCP packet 614, the UE may change RX_NEXT to be X+1, and may start receiving the missing packets starting from the sequence number X+1. On the other hand, if the UE determines that the difference N does not exceed the sequence jump threshold, the UE may receive and process the second PDCP packet 614, without disregarding the second PDCP packet 614. In some cases, the disregarding of the second PDCP packet 614 may include discarding the second PDCP packet 614. If the UE does not discard the second PDCP packet 614 but disregards the second PDCP packet 614 by maintaining in a storage portion until the missing packets are received and processed, RX_NEXT may remain as X+N+1, and the UE may still start receiving the missing packets starting from the sequence number X+1

As shown in the example diagram 630 of FIG. 6B, in the case of the PDCP SN jump of N, if the UE disregards the second PDCP packet 614 (shown in FIG. 6A) from processing, the missing PDCP packets respectively associated with sequence numbers that are greater than the sequence number of the first PDCP packet 612 and less than the sequence number of the second PDCP packet are received and processed by the UE, where the missing PDCP packets may be PDCP packets after the first PDCP packet 612 and before the second PDCP packet 614, without relying on a reordering timer. Thus, missing PDCP packets starting with a missing PDCP packet 632 with a sequence number of X+1 are received and processed, until a missing PDCP packet 634 is received and processed. After processing the missing PDCP packet 634, a PDCP packet 636 is processed. If the second PDCP packet 614 with a sequence number X+N has been discarded, the PDCP packet 636 may be a newly received PDCP packet with the sequence number X+N and may be processed. If the second PDCP packet 614 has not been discarded but has been maintained in a storage portion, the PDCP packet 636 may be the second PDCP packet 614 retrieved from the storage portion and may be processed. Then, subsequent PDCP packets are received and processed.

In an aspect, as discussed above, the UE may check whether a number of discarded packets is less than a discard threshold. As shown in the example diagram 650 of FIG. 6C, in the case of the PDCP SN jump of N, if the UE determines that the difference between the sequence number of the first PDCP packet 612 and the sequence number of the second PDCP packet 656 is N and exceeds the sequence jump threshold, the UE may discard the second PDCP packet 656 and PDCP packets each having a respective sequence number higher than that of the second PDCP packet 656, while checking if a number of discarded packets is less than the discard threshold. In an aspect, when a number of the discarded PDCP packets including the discarded second PDCP packet 656 and the discarded PDCP packets each having a respective sequence number higher than that of the second PDCP packet 656 is less than a discard threshold, then the UE continues to discard PDCP packets, e.g., each having a respective sequence number higher than that of the second PDCP packet 656. In FIG. 6C, the discard threshold is 1000. When the second PDCP packet 656 through a PDCP packet 660 with the sequence number X+N+998 are (received and) discarded, the number of the discarded PDCP packets is 999 and thus less than the discard threshold. Hence, in this case, subsequently, the UE continues to discard a PDCP packet 662 with the sequence number X+N+999, at which the number of the discarded PDCP packets reaches the discard threshold. At this point, the UE no longer discards PDCP packets, but instead receives and processes a subsequent packet 664 with the sequence number X+N+1000.

While discarding the packets such as the second PDCP packet 656 through the PDCP packet 660, the UE may receive and process missing packets In an aspect, as discussed above, in addition to checking whether the number of discarded packets is less than a discard threshold, the UE may further check whether a number of the missing packets received is greater than a received packet threshold. In FIG. 6C, due to the PDCP SN jump of N, the missing packets may be PDCP packets with sequence numbers ranging from X+1 to X+N−1. As the UE receives and processes the missing packets, the UE may start with receiving and processing a PDCP packet 652 with a sequence number X+1 and receive subsequent missing packets with subsequent sequence numbers. In the example of FIG. 6C, the received packet threshold is equal to P. If the UE receives and processes the missing packets up to a PDCP packet 654 with a sequence number X+P, the UE may determine that the number of missing packets received is less than or equal to the received packet threshold, P. After receiving and processing missing packets up to the PDCP packet 654 with a sequence number X+P, if one more missing packet is received and processed, the UE may determine that the number of the missing packets received is greater than the received packet threshold, P. The UE may continue discarding the PDCP packets with sequence numbers greater than X+N if the number of discarded PDCP packets is less than the discard threshold (1000) and the number of the missing packets received is greater than the received packet threshold, P. On the other hand, if the number of discarded PDCP packets is greater than or equal to the discard threshold (1000) and/or the number of the missing packets received is less than or equal to the received packet threshold, P, the UE may stop discarding the PDCP packets and may start receiving and processing PDCP packets with sequence numbers higher than X+N.

In an aspect, as discussed above, the UE may activate a packet count timer when the UE receives the second packet and may receive packets until the packet count timer expires and/or a number of the post-jump packets reaches a second received packet threshold. Then, the UE may check to determine whether a ratio of valid post-jump packets received to a total number of packets received is greater than the second received packet threshold. In FIG. 6D, due to the PDCP SN jump of N, the missing packets may be PDCP packets with sequence numbers ranging from X+1 to X+N−1. When a second PDCP packet 676 is received, the UE may activate a packet count timer, and receive PDCP packets until the packet count timer expires and/or a number of the post-jump PDCP packets reaches the second received packet threshold. In FIG. 6D, the UE receives missing packets with sequence numbers ranging from X+1 to X+P (a PDCP packet 672 through a PDCP packet 674) and receives post-jump PDCP packets with sequence numbers ranging from X+N to X+N+99 (the second PDCP packet 676 and a PDCP packet 678 through a PDCP packet 680), until the packet count timer expires and/or a number of the post-jump PDCP packets reaches the second received packet threshold. When the packet count timer expires and/or a number of the post-jump PDCP packets reaches the second received packet threshold, the UE stops receiving the PDCP packets and determines a number of valid post-jump PDCP packets among the post-jump PDCP packets received. In an example, out of the 100 post-jump PDCP packets are received, less than 100 post-jump PDCP packets may be valid post-jump PDCP packets. Subsequently, the UE determines whether a ratio of the number of the valid post-jump PDCP packets to the total number of PDCP packets received by the UE exceeds the valid packet ratio threshold. If the ratio exceeds the valid packet ratio threshold, the UE may process the post-jump PDCP packets received by the UE. On the other hand, if the ratio does not exceed the valid packet ratio threshold, the UE ay discard the post-jump PDCP packets received by the UE.

Figure 7:
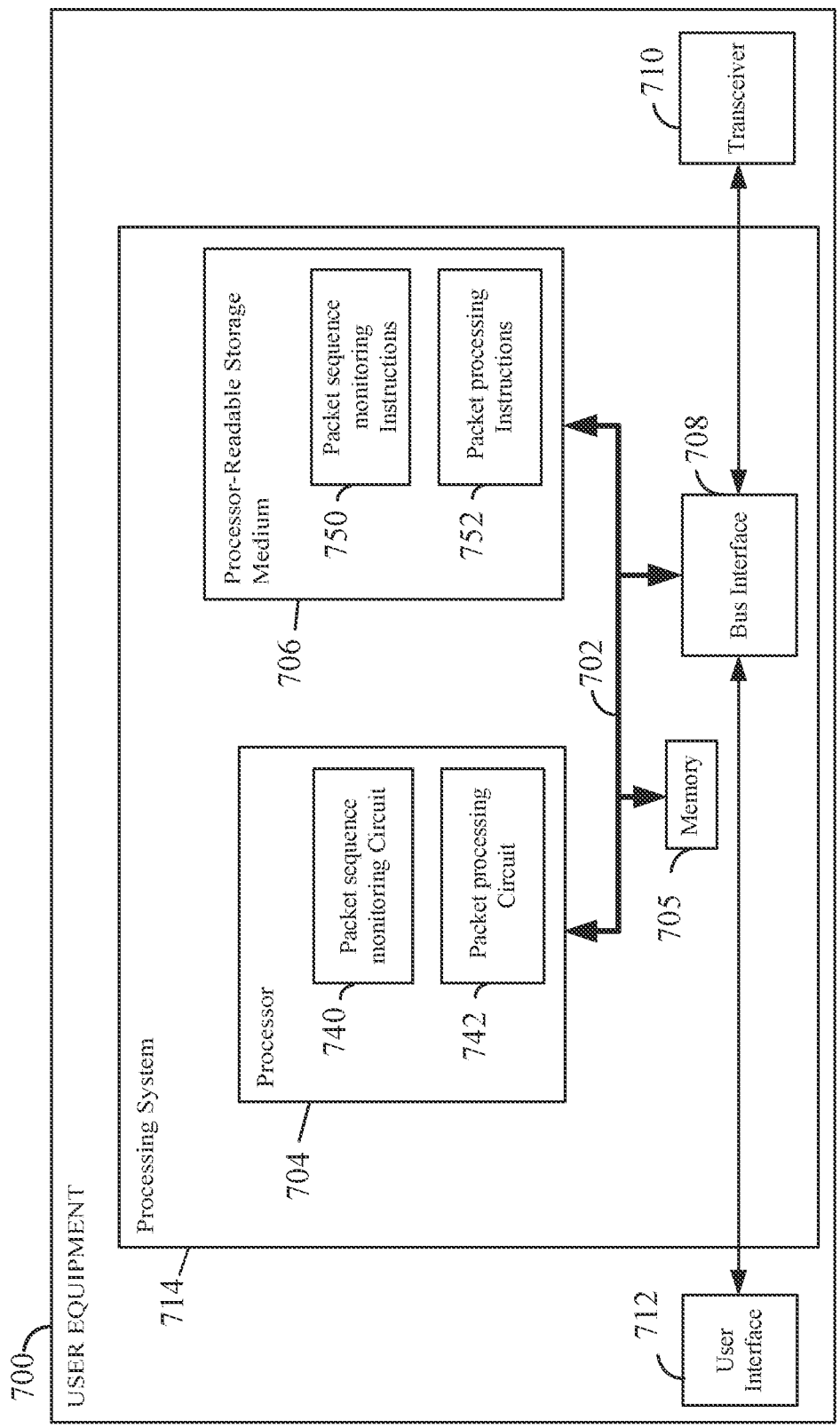
FIG. 7 is a block diagram conceptually illustrating an example of a hardware implementation for a user equipment according to some aspects of the disclosure.

FIG. 7 is a block diagram illustrating an example of a hardware implementation for a UE 700 employing a processing system 714. For example, the UE 700 may be a user equipment (UE) as illustrated in any one or more of FIGS. 1, 2, and/or 3.

The UE 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 700 may be configured to perform any one or more of the functions described herein. That is, the processor 704, as utilized in a UE 700, may be used to implement any one or more of the processes and procedures described below and illustrated in FIGS. 8 and/or 9 and/or 10.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and processor-readable media (represented generally by the processor-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided.

In some aspects of the disclosure, the processor 704 may include packet sequence monitoring circuitry 740 configured for various functions, including, for example, determining whether a difference between a sequence number of a first packet and a sequence number of a second packet received subsequent to receiving the first packet exceeds a sequence jump threshold. For example, the packet sequence monitoring circuitry 740 may be configured to implement one or more of the functions described below in relation to FIGS. 8-10, including, e.g., blocks 802, 908, and 1008.

In some aspects, the packet sequence monitoring circuitry 740 may be configured for various functions, including, for example, determining that a second packet received subsequent to receiving a first packet is out of order in sequence. For example, the packet sequence monitoring circuitry 740 may be configured to implement one or more of the functions described below in relation to FIGS. 9 and 10, including, e.g., blocks 902 and 1002.

In some aspects of the disclosure, the processor 704 may include packet processing circuitry 742 configured for various functions, including, for example, disregarding the second packet from processing in response to at least determining that the difference is greater than the sequence jump threshold. For example, the packet processing circuitry 742 may be configured to implement one or more of the functions described below in relation to FIGS. 8-10, including, e.g., blocks 804, 958, and 1022.

In some aspects, the packet processing circuitry 742 may be configured for various functions, including, for example, receiving and processing a plurality of packets respectively associated with a plurality of sequence numbers that are greater than the sequence number of the first packet and less than the sequence number of the second packet. For example, the packet processing circuitry 742 may be configured to implement one or more of the functions described below in relation to FIGS. 8-10, including, e.g., blocks 806, 960, and 1024.

In some aspects, the packet processing circuitry 742 may be configured for various functions, including, for example, determining a maximum number of packets capable of being received within a reordering timer. For example, the packet processing circuitry 742 may be configured to implement one or more of the functions described below in relation to FIGS. 9 and 10, including, e.g., block 904 and 1004.

In some aspects, the packet processing circuitry 742 may be configured for various functions, including, for example, determining the sequence jump threshold based on the maximum number of packets. For example, the packet processing circuitry 742 may be configured to implement one or more of the functions described below in relation to FIGS. 9 and 10, including, e.g., blocks 906 and 1006.

In some aspects, the packet processing circuitry 742 may be configured for various functions, including, for example, activating a reordering timer in response to determining that the difference is less than or equal to the sequence jump threshold. For example, the packet processing circuitry 742 may be configured to implement one or more of the functions described below in relation to FIGS. 9 and 10, including, e.g., blocks 912 and 1012.

In some aspects, the packet processing circuitry 742 may be configured for various functions, including, for example, receiving and process one or more packets of the plurality of packets while the reordering timer is activated. For example, the packet processing circuitry 742 may be configured to implement one or more of the functions described below in relation to FIGS. 9 and 10, including, e.g., blocks 914 and 1014.

In some aspects, the packet processing circuitry 742 may be configured for various functions, including, for example, discarding other one or more packets of the plurality of packets that are not received or processed when the reordering timer expires. For example, the packet processing circuitry 742 may be configured to implement one or more of the functions described below in relation to FIGS. 9 and 10, including, e.g., blocks 916 and 1016.

In some aspects, the packet processing circuitry 742 may be configured for various functions, including, for example, determining a number of discarded packets, where each discarded packet is discarded in response to having a sequence number that is greater than a sequence number of a previously received packet by the sequence jump threshold. For example, the packet processing circuitry 742 may be configured to implement one or more of the functions described below in relation to FIG. 9, including, e.g., block 952.

In some aspects, the packet processing circuitry 742 may be configured for various functions, including, for example, determining that the number of discarded packets is less than a discard threshold. For example, the packet processing circuitry 742 may be configured to implement one or more of the functions described below in relation to FIG. 9, including, e.g., block 954.

In some aspects, the packet processing circuitry 742 may be configured for various functions, including, for example, determining that a number of the plurality of packets received is greater than a received packet threshold. For example, the packet processing circuitry 742 may be configured to implement one or more of the functions described below in relation to FIG. 9, including, e.g., block 956.

In some aspects, the packet processing circuitry 742 may be configured for various functions, including, for example, discarding one or more packets each having a respective sequence number greater than the sequence number of the second packet in response to at least determining that the difference is greater than the sequence jump threshold. For example, the packet processing circuitry 742 may be configured to implement one or more of the functions described below in relation to FIG. 10, including, e.g., block 1042.

In some aspects, the packet processing circuitry 742 may be configured for various functions, including, for example, determining a number of discarded packets including the one or more discarded packets and the discarded second packet. For example, the packet processing circuitry 742 may be configured to implement one or more of the functions described below in relation to FIG. 10, including, e.g., block 1044.

In some aspects, the packet processing circuitry 742 may be configured for various functions, including, for example, determining whether the number of discarded packets is less than a discard threshold. For example, the packet processing circuitry 742 may be configured to implement one or more of the functions described below in relation to FIG. 10, including, e.g., block 1046.

In some aspects, the packet processing circuitry 742 may be configured for various functions, including, for example, determining whether a number of the plurality of packets received is greater than a received packet threshold. For example, the packet processing circuitry 742 may be configured to implement one or more of the functions described below in relation to FIG. 10, including, e.g., block 1048.

In some aspects, the packet processing circuitry 742 may be configured for various functions, including, for example, discarding at least one additional packet each having a respective sequence number greater than sequence numbers of the discarded packets. For example, the packet processing circuitry 742 may be configured to implement one or more of the functions described below in relation to FIG. 10, including, e.g., block 1050.

In some aspects, the packet processing circuitry 742 may be configured for various functions, including, for example, receiving and processing the at least one additional packet each having the respective sequence number greater than sequence numbers of the discarded packets. For example, the packet processing circuitry 742 may be configured to implement one or more of the functions described below in relation to FIG. 10, including, e.g., block 1052.

In some aspects, the packet processing circuitry 742 may be configured for various functions, including, for example, receiving and process another second packet having the sequence number of the second packet after discarding the second packet and receiving the plurality of packets. For example, the packet processing circuitry 742 may be configured to implement one or more of the functions described below in relation to FIGS. 9 and 10, including, e.g., blocks 962 and 1054.

In some aspects, the packet processing circuitry 742 may be configured for various functions, including, for example, retrieving the second packet from the storage portion and process the second packet after receiving the plurality of packets. For example, the packet processing circuitry 742 may be configured to implement one or more of the functions described below in relation to FIGS. 9 and 10, including, e.g., blocks 964 and 1056.

In some aspects, the packet processing circuitry 742 may be configured for various functions, including, for example, activating a packet count timer when the second packet is received. For example, the packet processing circuitry 742 may be configured to implement one or more of the functions described below in relation to FIG. 10, including, e.g., block 1072.

In some aspects, the packet processing circuitry 742 may be configured for various functions, including, for example, receiving a plurality of post-jump packets having respective sequence numbers greater than or equal to the sequence number of the second packet until the packet count timer expires and/or a number of the plurality of post-jump packets reaches a second received packet threshold. For example, the packet processing circuitry 742 may be configured to implement one or more of the functions described below in relation to FIG. 10, including, e.g., block 1074.

In some aspects, the packet processing circuitry 742 may be configured for various functions, including, for example, determining a number of valid post-jump packets among the plurality of post-jump packets. For example, the packet processing circuitry 742 may be configured to implement one or more of the functions described below in relation to FIG. 10, including, e.g., block 1076.

In some aspects, the packet processing circuitry 742 may be configured for various functions, including, for example, determining whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold. For example, the packet processing circuitry 742 may be configured to implement one or more of the functions described below in relation to FIG. 10, including, e.g., block 1078.

In some aspects, the packet processing circuitry 742 may be configured for various functions, including, for example, processing the plurality of post-jump packets in response to determining that the ratio exceeds the valid packet ratio threshold. For example, the packet processing circuitry 742 may be configured to implement one or more of the functions described below in relation to FIG. 10, including, e.g., block 1080.

In some aspects, the packet processing circuitry 742 may be configured for various functions, including, for example, discarding the plurality of post-jump packets in response to determining that the ratio does not exceed the valid packet ratio threshold. For example, the packet processing circuitry 742 may be configured to implement one or more of the functions described below in relation to FIG. 10, including, e.g., block 1082.

The processor 704 is responsible for managing the bus 702 and general processing, including the execution of software stored on the processor-readable storage medium 706. The software, when executed by the processor 704, causes the processing system 714 to perform the various functions described below for any particular apparatus. The processor-readable storage medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 706. The processor-readable storage medium 706 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 706 may reside in the processing system 714, external to the processing system 714, or distributed across multiple entities including the processing system 714. The processor-readable storage medium 706 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 706 may include packet sequence monitoring software/instructions 750 configured for various functions, including, for example, determining whether a difference between a sequence number of a first packet and a sequence number of a second packet received subsequent to receiving the first packet exceeds a sequence jump threshold. For example, the packet sequence monitoring software/instructions 750 may be configured to implement one or more of the functions described below in relation to FIGS. 8-10, including, e.g., blocks 802, 908, and 1008.

In some aspects, the packet sequence monitoring software/instructions 750 may be configured for various functions, including, for example, determining that a second packet received subsequent to receiving a first packet is out of order in sequence. For example, packet sequence monitoring software/instructions 750 may be configured to implement one or more of the functions described below in relation to FIGS. 9 and 10, including, e.g., blocks 902 and 1002.

In some aspects of the disclosure, the processor-readable storage medium 706 may include packet processing software/instructions 752 configured for various functions, including, for example, disregarding the second packet from processing in response to at least determining that the difference is greater than the sequence jump threshold. For example, the packet processing software/instructions 752 may be configured to implement one or more of the functions described below in relation to FIGS. 8-10, including, e.g., blocks 804, 958, and 1022.

In some aspects, the packet processing software/instructions 752 may be configured for various functions, including, for example, receiving and processing a plurality of packets respectively associated with a plurality of sequence numbers that are greater than the sequence number of the first packet and less than the sequence number of the second packet. For example, the packet processing software/instructions 752 may be configured to implement one or more of the functions described below in relation to FIGS. 8-10, including, e.g., blocks 806, 960, and 1024.

In some aspects, the packet processing software/instructions 752 may be configured for various functions, including, for example, determining a maximum number of packets capable of being received within a reordering timer. For example, the packet processing software/instructions 752 may be configured to implement one or more of the functions described below in relation to FIGS. 9 and 10, including, e.g., blocks 904 and 1004.

In some aspects, the packet processing software/instructions 752 may be configured for various functions, including, for example, determining the sequence jump threshold based on the maximum number of packets. For example, the packet processing software/instructions 752 may be configured to implement one or more of the functions described below in relation to FIGS. 9 and 10, including, e.g., blocks 906 and 1006.

In some aspects, the packet processing software/instructions 752 may be configured for various functions, including, for example, activating a reordering timer in response to determining that the difference is less than or equal to the sequence jump threshold. For example, the packet processing software/instructions 752 may be configured to implement one or more of the functions described below in relation to FIGS. 9 and 10, including, e.g., blocks 912 and 1012.

In some aspects, the packet processing software/instructions 752 may be configured for various functions, including, for example, receiving and process one or more packets of the plurality of packets while the reordering timer is activated. For example, the packet processing software/instructions 752 may be configured to implement one or more of the functions described below in relation to FIGS. 9 and 10, including, e.g., blocks 914 and 1014.

In some aspects, the packet processing software/instructions 752 may be configured for various functions, including, for example, discarding other one or more packets of the plurality of packets that are not received or processed when the reordering timer expires. For example, the packet processing software/instructions 752 may be configured to implement one or more of the functions described below in relation to FIGS. 9 and 10, including, e.g., blocks 916 and 1016.

In some aspects, the packet processing software/instructions 752 may be configured for various functions, including, for example, determining a number of discarded packets, where each discarded packet is discarded in response to having a sequence number that is greater than a sequence number of a previously received packet by the sequence jump threshold. For example, the packet processing software/instructions 752 may be configured to implement one or more of the functions described below in relation to FIG. 9, including, e.g., block 952.

In some aspects, the packet processing software/instructions 752 may be configured for various functions, including, for example, determining that the number of discarded packets is less than a discard threshold. For example, the packet processing software/instructions 752 may be configured to implement one or more of the functions described below in relation to FIG. 9, including, e.g., block 954.

In some aspects, the packet processing software/instructions 752 may be configured for various functions, including, for example, determining that a number of the plurality of packets received is greater than a received packet threshold. For example, the packet processing software/instructions 752 may be configured to implement one or more of the functions described below in relation to FIG. 9, including, e.g., block 956.

In some aspects, the packet processing software/instructions 752 may be configured for various functions, including, for example, discarding one or more packets each having a respective sequence number greater than the sequence number of the second packet in response to at least determining that the difference is greater than the sequence jump threshold. For example, the packet processing software/instructions 752 may be configured to implement one or more of the functions described below in relation to FIG. 10, including, e.g., block 1042.

In some aspects, the packet processing software/instructions 752 may be configured for various functions, including, for example, determining a number of discarded packets including the one or more discarded packets and the discarded second packet. For example, the packet processing software/instructions 752 may be configured to implement one or more of the functions described below in relation to FIG. 10, including, e.g., block 1044.

In some aspects, the packet processing software/instructions 752 may be configured for various functions, including, for example, determining whether the number of discarded packets is less than a discard threshold. For example, the packet processing software/instructions 752 may be configured to implement one or more of the functions described below in relation to FIG. 10, including, e.g., block 1046.

In some aspects, the packet processing software/instructions 752 may be configured for various functions, including, for example, determining whether a number of the plurality of packets received is greater than a received packet threshold. For example, the packet processing software/instructions 752 may be configured to implement one or more of the functions described below in relation to FIG. 10, including, e.g., block 1048.

In some aspects, the packet processing software/instructions 752 may be configured for various functions, including, for example, discarding at least one additional packet each having a respective sequence number greater than sequence numbers of the discarded packets. For example, the packet processing software/instructions 752 may be configured to implement one or more of the functions described below in relation to FIG. 10, including, e.g., block 1050.

In some aspects, the packet processing software/instructions 752 may be configured for various functions, including, for example, receiving and processing the at least one additional packet each having the respective sequence number greater than sequence numbers of the discarded packets. For example, the packet processing software/instructions 752 may be configured to implement one or more of the functions described below in relation to FIG. 10, including, e.g., block 1052.

In some aspects, the packet processing software/instructions 752 may be configured for various functions, including, for example, receiving and process another second packet having the sequence number of the second packet after discarding the second packet and receiving the plurality of packets. For example, the packet processing software/instructions 752 may be configured to implement one or more of the functions described below in relation to FIGS. 9 and 10, including, e.g., blocks 962 and 1054.

In some aspects, the packet processing software/instructions 752 may be configured for various functions, including, for example, retrieving the second packet from the storage portion and process the second packet after receiving the plurality of packets. For example, the packet processing software/instructions 752 may be configured to implement one or more of the functions described below in relation to FIGS. 9 and 10, including, e.g., blocks 964 and 1056.

In some aspects, the packet processing software/instructions 752 may be configured for various functions, including, for example, activating a packet count timer when the second packet is received. For example, the packet processing software/instructions 752 may be configured to implement one or more of the functions described below in relation to FIG. 10, including, e.g., block 1072.

In some aspects, the packet processing software/instructions 752 may be configured for various functions, including, for example, receiving a plurality of post-jump packets having respective sequence numbers greater than or equal to the sequence number of the second packet until the packet count timer expires and/or a number of the plurality of post-jump packets reaches a second received packet threshold. For example, the packet processing software/instructions 752 may be configured to implement one or more of the functions described below in relation to FIG. 10, including, e.g., block 1074.

In some aspects, the packet processing software/instructions 752 may be configured for various functions, including, for example, determining a number of valid post-jump packets among the plurality of post-jump packets. For example, the packet processing software/instructions 752 may be configured to implement one or more of the functions described below in relation to FIG. 10, including, e.g., block 1076.

In some aspects, the packet processing software/instructions 752 may be configured for various functions, including, for example, determining whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold. For example, the packet processing software/instructions 752 may be configured to implement one or more of the functions described below in relation to FIG. 10, including, e.g., block 1078.

In some aspects, the packet processing software/instructions 752 may be configured for various functions, including, for example, processing the plurality of post-jump packets in response to determining that the ratio exceeds the valid packet ratio threshold. For example, the packet processing software/instructions 752 may be configured to implement one or more of the functions described below in relation to FIG. 10, including, e.g., block 1080.

In some aspects, the packet processing software/instructions 752 may be configured for various functions, including, for example, discarding the plurality of post-jump packets in response to determining that the ratio does not exceed the valid packet ratio threshold. For example, the packet processing software/instructions 752 may be configured to implement one or more of the functions described below in relation to FIG. 10, including, e.g., block 1082.

Figure 8:
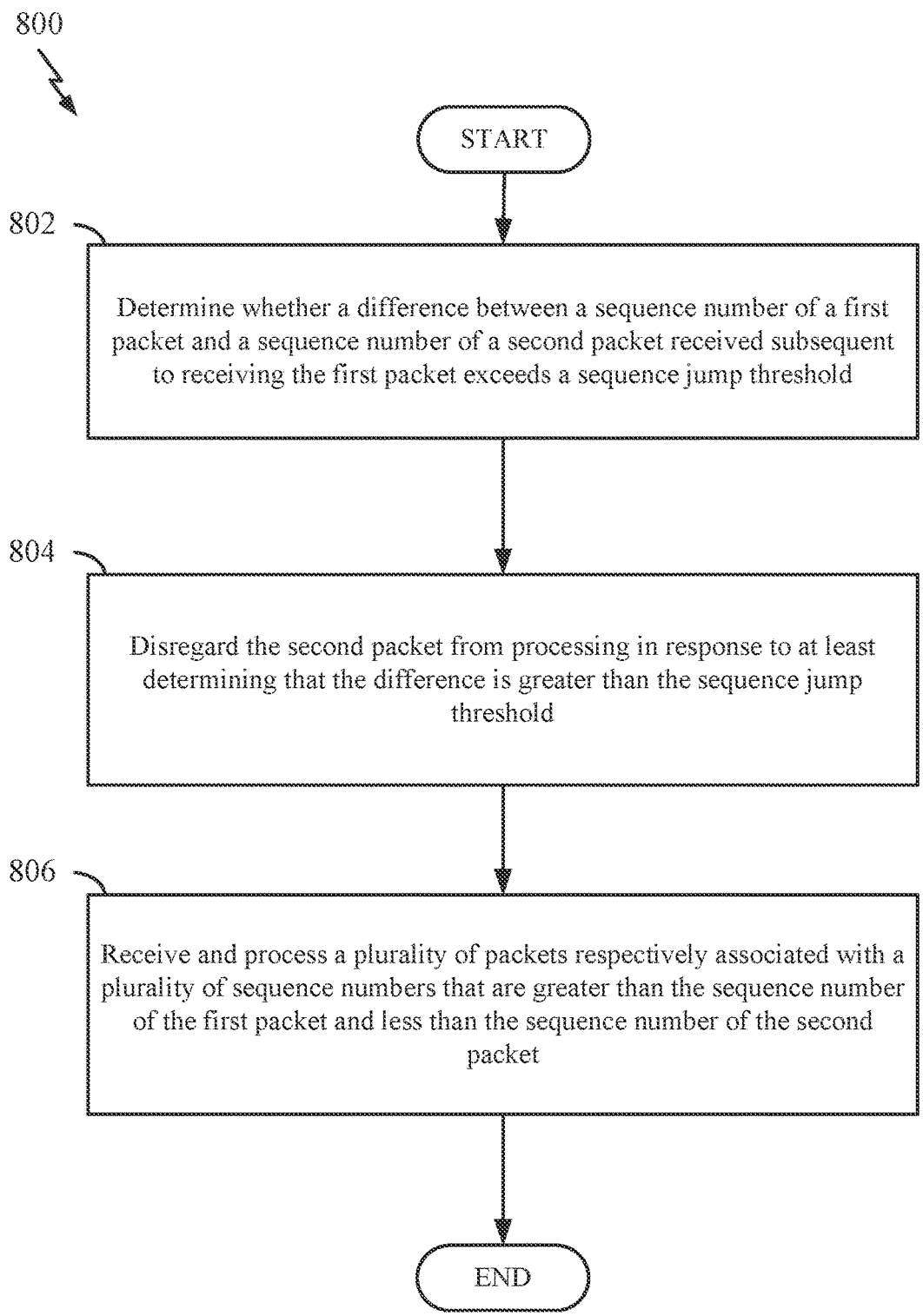
FIG. 8 is a flow chart illustrating an exemplary process for packet processing according to some aspects of the disclosure.

FIG. 8 is a flow chart illustrating an exemplary process 800 for packet processing in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the UE 700 illustrated in FIG. 7. In some examples, the process 800 may be carried out by any suitable apparatus or means for carrying out the functions or algorithm described below.

At block 802, the UE may determine whether a difference between a sequence number of a first packet and a sequence number of a second packet received subsequent to receiving the first packet exceeds a sequence jump threshold.

At block 804, the UE may disregard the second packet from processing in response to at least determining that the difference is greater than the sequence jump threshold.

At block 806, the UE may receive and process a plurality of packets respectively associated with a plurality of sequence numbers that are greater than the sequence number of the first packet and less than the sequence number of the second packet.

In an aspect, the sequence number of the first packet, the sequence number of the second packet, and the plurality of sequence numbers may be a PDCP sequence number of the first packet, a PDCP sequence number of the second packet, and a plurality of PDCP sequence numbers, respectively.

Figure 9A:
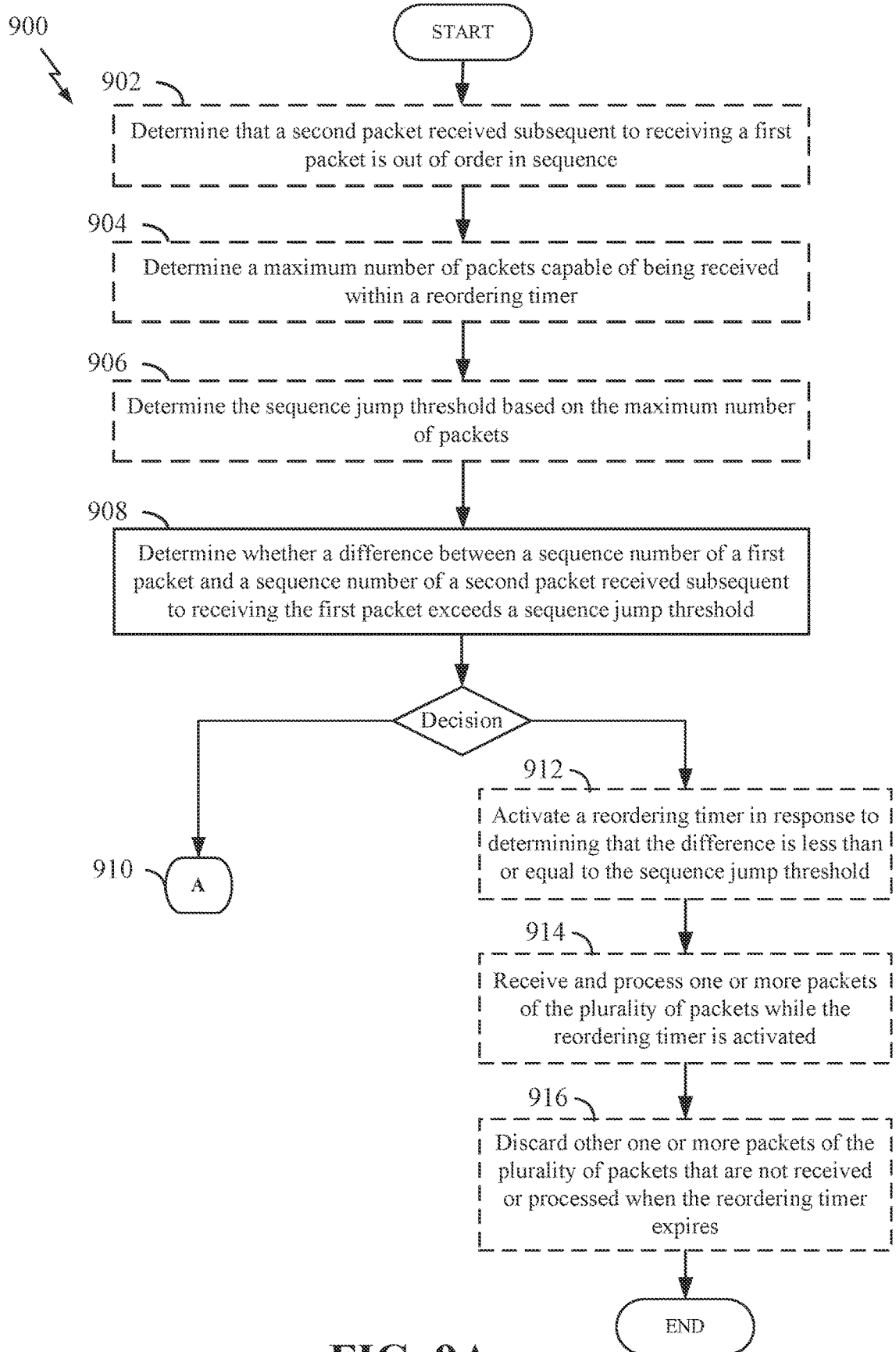
FIG. 9 (comprising FIGS. 9A and 9B) is a flow chart illustrating an exemplary process for packet processing according to some aspects of the disclosure.
Figure 9B:
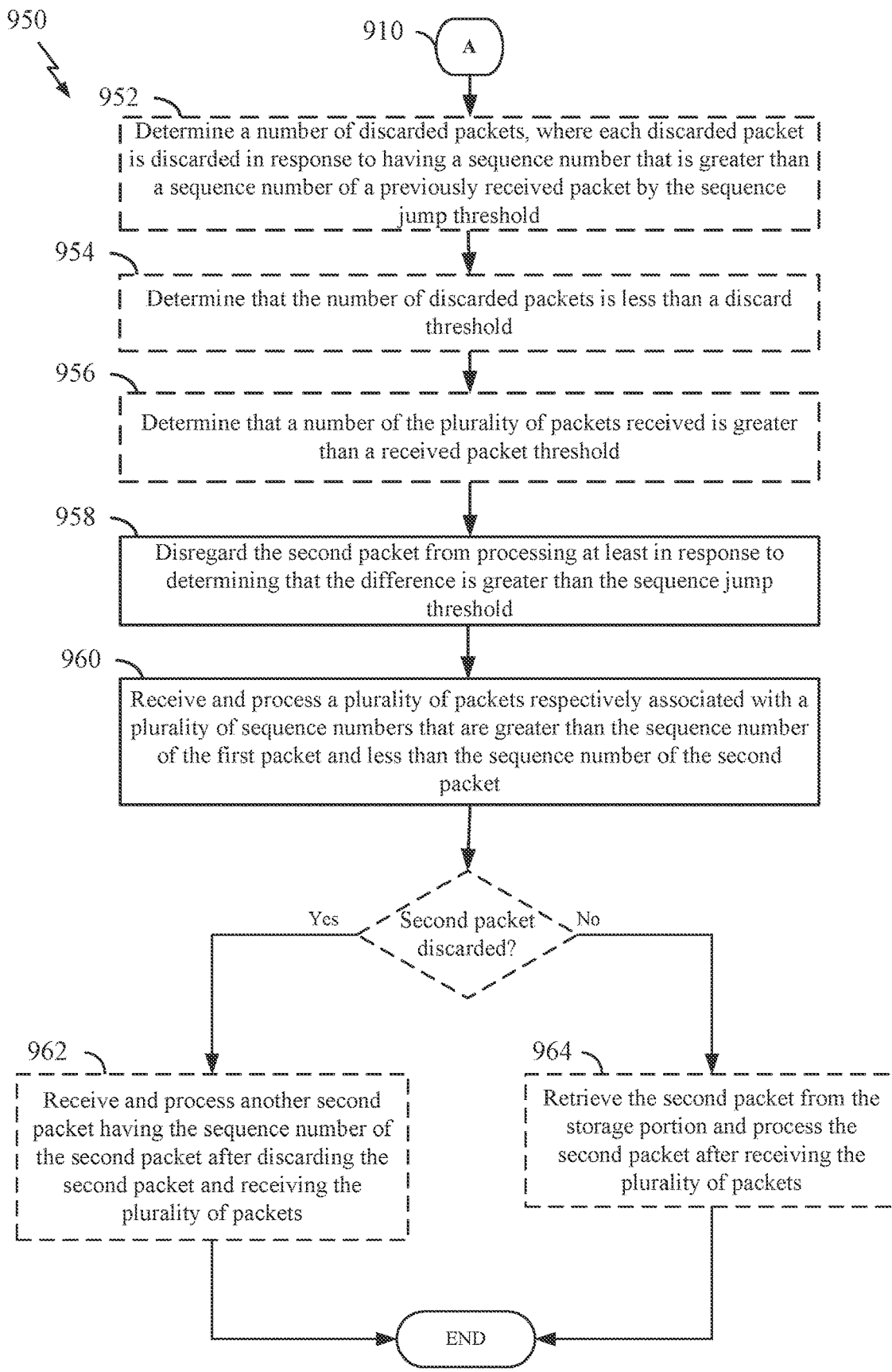

FIG. 9 (comprising FIGS. 9A and 9B) is a flow chart illustrating an exemplary process for packet processing in accordance with some aspects of the present disclosure. FIG. 9A is a flow chart illustrating an exemplary process 900 for packet processing in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the UE 700 illustrated in FIG. 7. In some examples, the process 900 may be carried out by any suitable apparatus or means for carrying out the functions or algorithm described below.

At block 902, the UE may determine that a second packet received subsequent to receiving a first packet is out of order in sequence.

At block 904, the UE may determine a maximum number of packets capable of being received within a reordering timer.

At block 906, the UE may determine a sequence jump threshold based on the maximum number of packets.

At block 908, the UE may determine whether a difference between a sequence number of the first packet and a sequence number of the second packet received subsequent to receiving the first packet exceeds a sequence jump threshold (e.g., sequence jump threshold determined at block 906). In an aspect, the first packet may be a first PDCP packet and the second packet may be a second PDCP packet. In an aspect, the first packet may be a last packet received prior to a cell change to a current base station utilized by the UE and the second packet may be a packet received first after the cell change to the current base station.

At block 910, if the difference between the sequence number of the first packet and the sequence number of the second packet exceeds the sequence jump threshold, the UE performs features illustrated in FIG. 9B below.

At block 912, if the difference between the sequence number of the first packet and the sequence number of the second packet does not exceed the sequence jump threshold, the UE activates a reordering timer in response to determining that the difference is less than or equal to the sequence jump threshold.

At block 914, the UE may receive and process one or more packets of the plurality of packets while the reordering timer is activated.

At block 916, the UE may discard other one or more packets of the plurality of packets that are not received or processed when the reordering timer expires.

FIG. 9B is a flow chart illustrating an exemplary process 950 for packet processing in accordance with some aspects of the present disclosure. As described below, some or all illustrated features may be omitted in a particular implementation within the scope of the present disclosure, and some illustrated features may not be required for implementation of all embodiments. In some examples, the process 950 may be carried out by the UE 700 illustrated in FIG. 7. In some examples, the process 950 may be carried out by any suitable apparatus or means for carrying out the functions or algorithm described below.

At block 910, the UE continues from the exemplary process 900 of FIG. 9A if the difference between the sequence number of the first packet and the sequence number of the second packet exceeds the sequence jump threshold.

At block 952, the UE may determine a number of discarded packets, where each discarded packet is discarded in response to having a sequence number that is greater than a sequence number of a previously received packet by the sequence jump threshold.

At block 954, the UE may determine that the number of discarded packets is less than a discard threshold.

At block 956, the UE may determine that a number of the plurality of packets received is greater than a received packet threshold At block 958, the UE may disregard the second packet from processing in response to at least determining that the difference is greater than the sequence jump threshold.

In an aspect, the UE may disregard the second packet by disregarding the second packet further in response to determining that a number of packets received after a cell change to a current base station utilized by the UE and prior to receiving the second packet is less than or equal to a post-cell-change received packet threshold.

In an aspect, the UE may disregard the second packet by discarding the second packet in response to at least determining that the difference is greater than the sequence jump threshold. In an aspect, the second packet may be discarded further in response to determining at block 954 that the number of discarded packets is less than the discard threshold. In an aspect, the discarded packets may be discarded subsequent to a cell change to a current base station utilized by the UE. In an aspect, the second packet may be discarded further in response to determining at block 956 that the number of the plurality of packets received is greater than the received packet threshold.

At block 960, the UE may receive and process a plurality of packets respectively associated with a plurality of sequence numbers that are greater than the sequence number of the first packet and less than the sequence number of the second packet. In an aspect, the sequence number of the first packet, the sequence number of the second packet, and the plurality of sequence numbers may be a PDCP sequence number of the first packet, a PDCP sequence number of the second packet, and a plurality of PDCP sequence numbers, respectively. In an aspect, the second packet may be disregarded at least until one or more of the plurality of packets are received and processed. In an aspect, the first packet may be a first PDCP packet, the second packet may be a second PDCP packet, and the plurality of packets may be a plurality of PDCP packets, or the first packet may be a first RLC packet, the second packet may be a second RLC packet, and the plurality of packets are may be plurality of RLC packets. In an aspect, the first PDCP packet, the second PDCP packet, and the plurality of packets may be received at a PDCP sublayer from an RLC sublayer and may be processed at the PDCP sublayer, or the first RLC packet, the second RLC packet, and the plurality of packets may be received at an RLC sublayer from a MAC sublayer and may be processed at the RLC sublayer.

At block 962, where the disregarding the second packet includes discarding the second packet, the UE may receive and process another second packet having the sequence number of the second packet after discarding the second packet and receiving the plurality of packets.

At block 964, where the disregarding the second packet includes maintaining the second packet in a storage portion without processing the second packet, the UE may retrieve the second packet from the storage portion and process the second packet after receiving the plurality of packets.

In one configuration, the UE 700 for packet processing includes means for determining whether a difference between a sequence number of a first packet and a sequence number of a second packet received subsequent to receiving the first packet exceeds a sequence jump threshold, means for disregarding the second packet from processing in response to at least determining that the difference is greater than the sequence jump threshold, and means for receiving and processing a plurality of packets respectively associated with a plurality of sequence numbers that are greater than the sequence number of the first packet and less than the sequence number of the second packet. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Figure 10A:
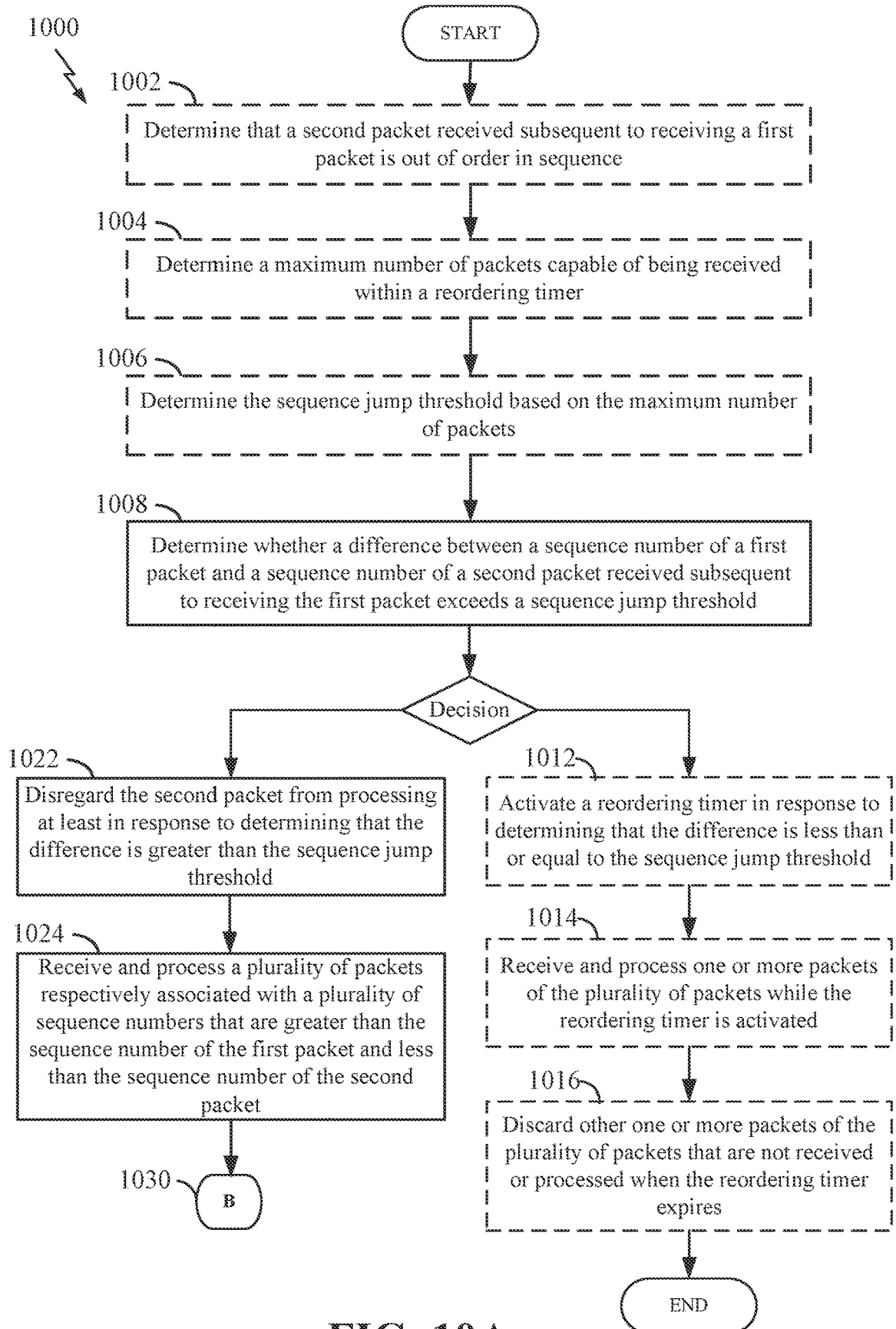
FIG. 10 (comprising FIGS. 10A, 10B, and 10C) is a flow chart illustrating an exemplary process for packet processing according to some aspects of the disclosure.
Figure 10B:
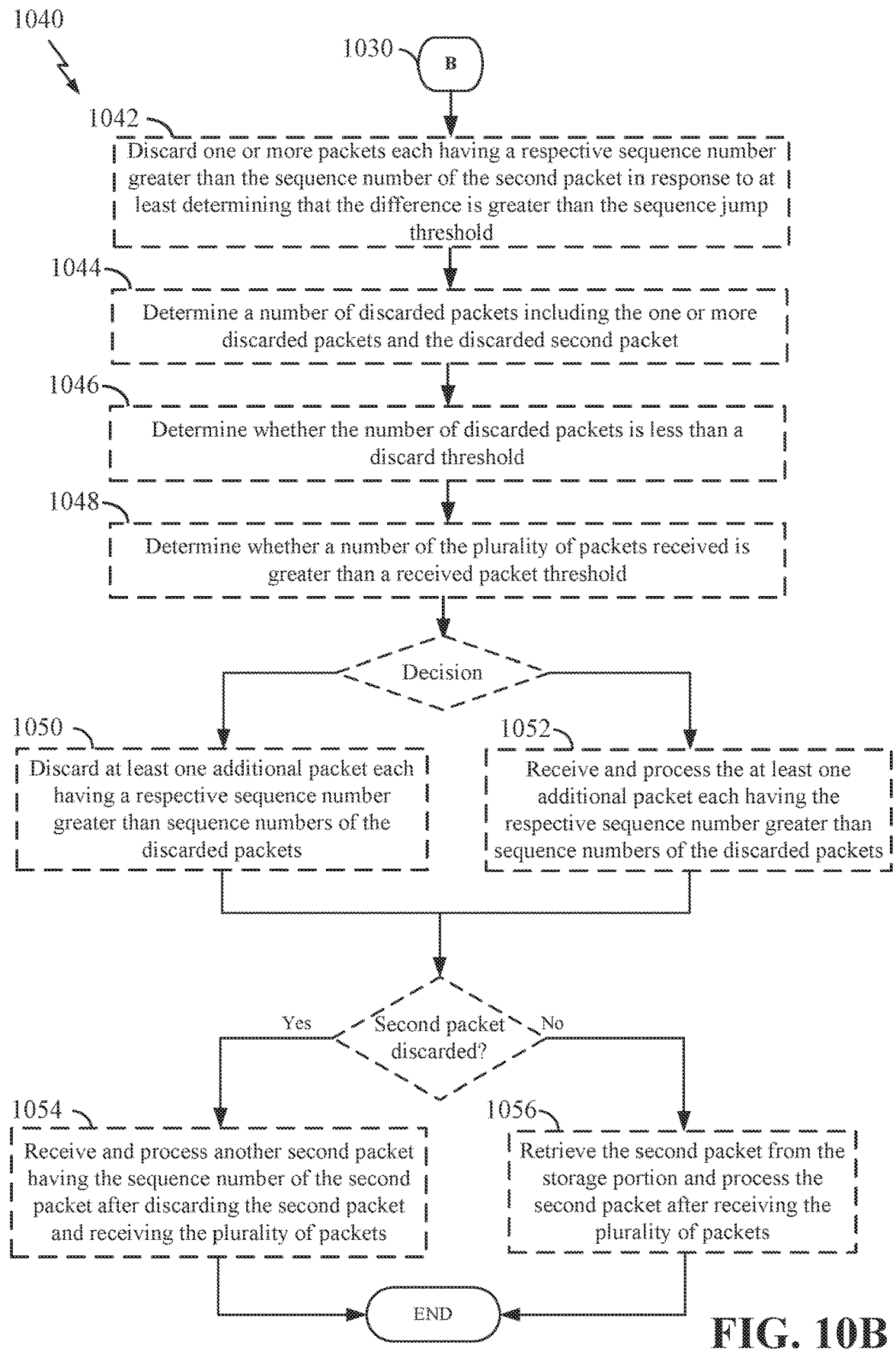
Figure 10C:
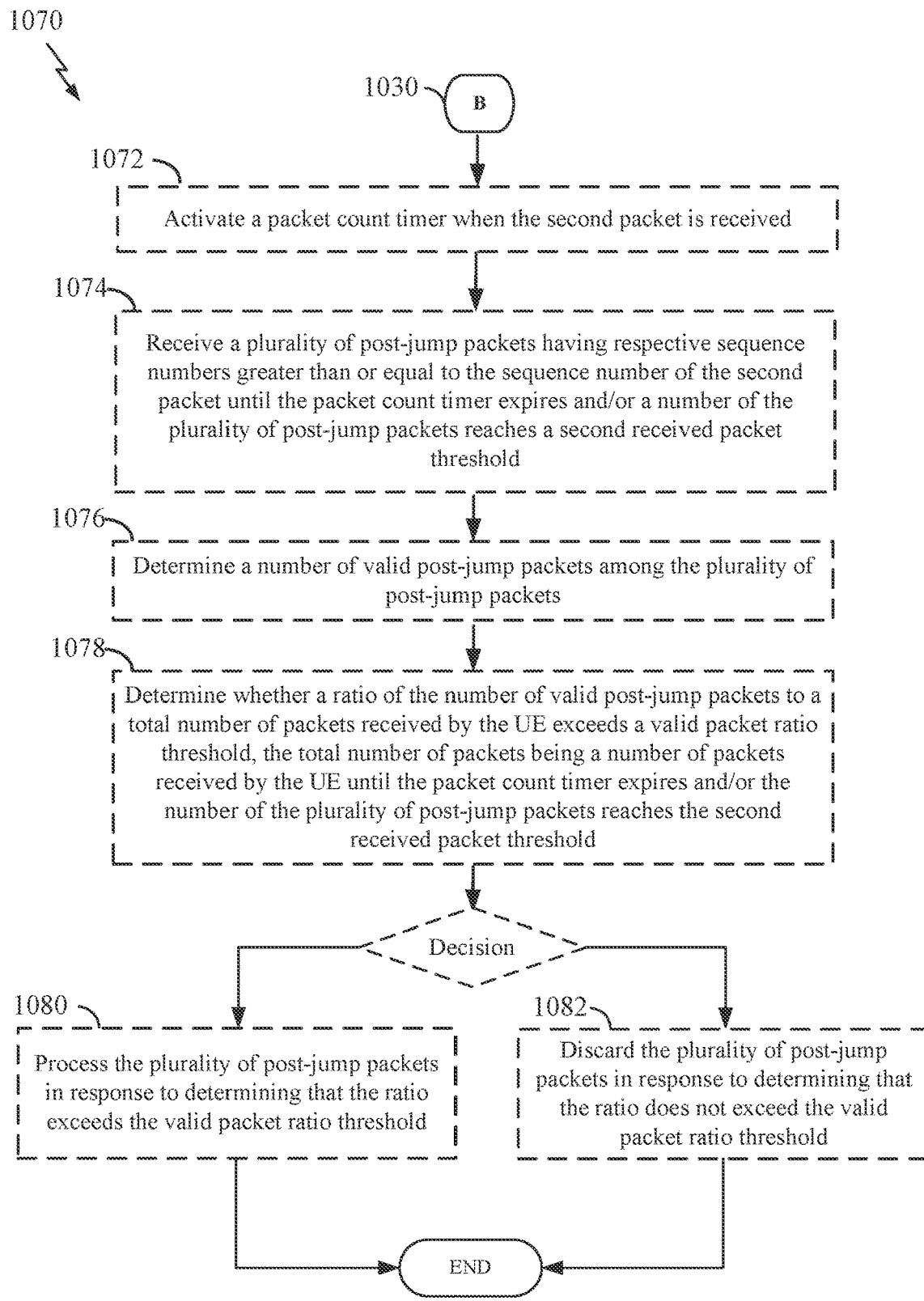

FIG. 10 (comprising FIGS. 10A, 10B, and 10C) is a flow chart illustrating an exemplary process for packet processing in accordance with some aspects of the present disclosure. FIG. 10A is a flow chart illustrating an exemplary process 1000 for packet processing in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the UE 700 illustrated in FIG. 7. In some examples, the process 1000 may be carried out by any suitable apparatus or means for carrying out the functions or algorithm described below.

At block 1002, in an aspect, the UE may determine that a second packet received subsequent to receiving a first packet is out of order in sequence.

At block 1004, in an aspect, the UE may determine a maximum number of packets capable of being received within a reordering timer.

At block 1006, in an aspect, the UE may determine a sequence jump threshold based on the maximum number of packets.

In an aspect, the sequence jump threshold may be based on a number of bits allocated to indicate a sequence number of a packet.

At block 1008, the UE may determine whether a difference between a sequence number of the first packet and a sequence number of the second packet received subsequent to receiving the first packet exceeds a sequence jump threshold (e.g., sequence jump threshold determined at block 1006). In an aspect, the first packet may be a first PDCP packet and the second packet may be a second PDCP packet. In an aspect, the first packet may be a last packet received prior to a cell change to a current base station utilized by the UE and the second packet may be a packet received first after the cell change to the current base station.

At block 1012, in response to determining that the difference is less than or equal to the sequence jump threshold, the UE may activate a reordering timer.

At block 1014, the UE may receive and process one or more packets of the plurality of packets while the reordering timer is activated.

At block 1016, the UE may discard other one or more packets of the plurality of packets that are not received or processed when the reordering timer expires.

At block 1022, in response to at least determining that the difference is greater than the sequence jump threshold, the UE may disregard the second packet from processing in response to at least determining that the difference is greater than the sequence jump threshold.

In an aspect, the disregarding by the UE the second packet in response to at least determining that the difference is greater than the sequence jump threshold at block 1022 may include disregarding the second packet in response to determining that the difference is greater than the sequence jump threshold and that a number of packets received after a cell change to a current base station utilized by the UE and prior to receiving the second packet is less than or equal to a post-cell-change received packet threshold.

At block 1024, the UE may receive and process a plurality of packets respectively associated with a plurality of sequence numbers that are greater than the sequence number of the first packet and less than the sequence number of the second packet. In an aspect, the sequence number of the first packet, the sequence number of the second packet, and the plurality of sequence numbers may be a PDCP sequence number of the first packet, a PDCP sequence number of the second packet, and a plurality of PDCP sequence numbers, respectively. In an aspect, the second packet may be disregarded at least until one or more of the plurality of packets are received and processed. In an aspect, the first packet may be a first PDCP packet, the second packet may be a second PDCP packet, and the plurality of packets may be a plurality of PDCP packets, or the first packet may be a first RLC packet, the second packet may be a second RLC packet, and the plurality of packets are may be plurality of RLC packets. In an aspect, the first PDCP packet, the second PDCP packet, and the plurality of packets may be received at a PDCP sublayer from an RLC sublayer and may be processed at the PDCP sublayer, or the first RLC packet, the second RLC packet, and the plurality of packets may be received at an RLC sublayer from a MAC sublayer and may be processed at the RLC sublayer.

At block 1030, if the difference between the sequence number of the first packet and the sequence number of the second packet exceeds the sequence jump threshold, the UE performs features illustrated in FIG. 10B and/or FIG. 10C below.

FIG. 10B is a flow chart illustrating an exemplary process 1040 for packet processing in accordance with some aspects of the present disclosure. As described below, some or all illustrated features may be omitted in a particular implementation within the scope of the present disclosure, and some illustrated features may not be required for implementation of all embodiments. In some examples, the process 1040 may be carried out by the UE 700 illustrated in FIG. 7. In some examples, the process 1050 may be carried out by any suitable apparatus or means for carrying out the functions or algorithm described below.

At block 1030, the UE continues from the exemplary process 1000 of FIG. 10A if the difference between the sequence number of the first packet and the sequence number of the second packet exceeds the sequence jump threshold.

In an aspect, the disregarding by the UE the second packet in response to at least determining that the difference is greater than the sequence jump threshold at block 1022 may include discarding the second packet in response to at least determining that the difference is greater than the sequence jump threshold.

At block 1042, in an aspect, the UE may discard one or more packets each having a respective sequence number greater than the sequence number of the second packet in response to at least determining that the difference is greater than the sequence jump threshold.

At block 1044, in an aspect, the UE may determine a number of discarded packets including the one or more discarded packets and the discarded second packet. In an aspect, the discarded packets may be discarded subsequent to a cell change to a current base station utilized by the UE.

At block 1046, in an aspect, the UE may determine whether the number of discarded packets is less than a discard threshold.

At block 1047, in an aspect, the UE may determine whether a number of the plurality of packets received is greater than a received packet threshold.

At block 1050, in an aspect, the UE may discard at least one additional packet each having a respective sequence number greater than sequence numbers of the discarded packets, in response to at least determining that the difference is greater than the sequence jump threshold and that the number of discarded packets is less than the discard threshold. In an aspect, the discarding by the UE the at least one additional packet in response to at least determining that the difference is greater than the sequence jump threshold and that the number of discarded packets is less than the discard threshold at block 1050 may include discarding the at least one additional packet in response to determining that the difference is greater than the sequence jump threshold, that the number of discarded packets is less than the discard threshold, and that the number of the plurality of packets received is greater than the received packet threshold.

At block 1052, in an aspect, the UE may receive and process the at least one additional packet each having the respective sequence number greater than the sequence numbers of the discarded packets in response to at least determining that the number of discarded packets is greater than or equal to the discard threshold. In an aspect, the UE at block 1052 may receive and process the at least one additional packet each having the respective sequence number greater than sequence numbers of the discarded packets in response to determining that the number of discarded packets is greater than or equal to the discard threshold and/or that the number of the plurality of packets received is less than or equal to the received packet threshold.

At block 1054, where the disregarding the second packet includes discarding the second packet, the UE may receive and process another second packet having the sequence number of the second packet after discarding the second packet and receiving the plurality of packets.

At block 1056, where the disregarding the second packet includes maintaining the second packet in a storage portion without processing the second packet, the UE may retrieve the second packet from the storage portion and process the second packet after receiving the plurality of packets.

FIG. 10C is a flow chart illustrating an exemplary process 1070 for packet processing in accordance with some aspects of the present disclosure. As described below, some or all illustrated features may be omitted in a particular implementation within the scope of the present disclosure, and some illustrated features may not be required for implementation of all embodiments. In some examples, the process 1070 may be carried out by the UE 700 illustrated in FIG. 7. In some examples, the process 1050 may be carried out by any suitable apparatus or means for carrying out the functions or algorithm described below.

At block 1030, the UE continues from the exemplary process 1000 of FIG. 10A if the difference between the sequence number of the first packet and the sequence number of the second packet exceeds the sequence jump threshold.

At block 1072, in an aspect, the UE may activate a packet count timer when the second packet is received.

At block 1074, in an aspect, the UE may receive a plurality of post-jump packets having respective sequence numbers greater than or equal to the sequence number of the second packet until the packet count timer expires and/or a number of the plurality of post-jump packets reaches a second received packet threshold.

At block 1076, in an aspect, the UE may determine a number of valid post-jump packets among the plurality of post-jump packets. In an aspect, the determining the number of the valid post-jump packets at block 1076 may include determining whether each of the plurality of post-jump packets is valid based on a header of a respective post-jump packet of the plurality of post-jump packets after deciphering the respective post-jump packet.

At block 1078, in an aspect, the UE may determine whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold.

At block 1080, in an aspect, the UE may process the plurality of post-jump packets in response to determining that the ratio exceeds the valid packet ratio threshold.

At block 1082, in an aspect, the UE may discard the plurality of post-jump packets in response to determining that the ratio does not exceed the valid packet ratio threshold.

In one configuration, the UE 700 for packet processing includes means for determining whether a difference between a sequence number of a first packet and a sequence number of a second packet received subsequent to receiving the first packet exceeds a sequence jump threshold, means for disregarding the second packet from processing in response to at least determining that the difference is greater than the sequence jump threshold, and means for receiving and processing a plurality of packets respectively associated with a plurality of sequence numbers that are greater than the sequence number of the first packet and less than the sequence number of the second packet. In an aspect, the UE 700 may further include means for determining a maximum number of packets capable of being received within a reordering timer, and determining the sequence jump threshold based on the maximum number of packets. In an aspect, the UE 700 may further include means for activating a reordering timer in response to determining that the difference is less than or equal to the sequence jump threshold, means for receiving and processing one or more packets of the plurality of packets while the reordering timer is activated, and means for discarding other one or more packets of the plurality of packets that are not received or processed when the reordering timer expires.

In an aspect, the UE 700 may further include means for discarding one or more packets each having a respective sequence number greater than the sequence number of the second packet in response to at least determining that the difference is greater than the sequence jump threshold, means for determining a number of discarded packets including the one or more discarded packets and the discarded second packet, means for determining whether the number of discarded packets is less than a discard threshold, and means for discarding at least one additional packet each having a respective sequence number greater than sequence numbers of the discarded packets in response to at least determining that the difference is greater than the sequence jump threshold and that the number of discarded packets is less than the discard threshold. In an aspect, the UE 700 may further include means for receiving and processing the at least one additional packet each having the respective sequence number greater than the sequence numbers of the discarded packets in response to at least determining that the number of discarded packets is greater than or equal to the discard threshold. In an aspect, the UE 700 may further include means for determining whether a number of the plurality of packets received is greater than a received packet threshold. In an aspect, the UE 700 may further include means for receiving and processing the at least one additional packet each having the respective sequence number greater than sequence numbers of the discarded packets in response to determining that the number of discarded packets is greater than or equal to the discard threshold and/or that the number of the plurality of packets received is less than or equal to the received packet threshold. In an aspect, the UE 700 may further include means for receiving and processing another second packet having the sequence number of the second packet after discarding the second packet and receiving the plurality of packets respectively associated with the plurality of sequence numbers that are greater than the sequence number of the first packet and less than the sequence number of the second packet. In an aspect, the UE 700 may further include means for retrieving the second packet from the storage portion and processing the second packet after receiving the plurality of packets.

In an aspect, the UE 700 may further include means for activating a packet count timer when the second packet is received, means for receiving a plurality of post-jump packets having respective sequence numbers greater than or equal to the sequence number of the second packet until the packet count timer expires and/or a number of the plurality of post-jump packets reaches a second received packet threshold, means for determining a number of valid post-jump packets among the plurality of post-jump packets, means for determining whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold, and means for processing the plurality of post-jump packets in response to determining that the ratio exceeds the valid packet ratio threshold. In an aspect, the UE 700 may further include means for discarding the plurality of post-jump packets in response to determining that the ratio does not exceed the valid packet ratio threshold.

In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the processor-readable storage medium 706, or any other suitable apparatus or means described in any one of the FIGS. 1 and/or 2, and utilizing, for example, the processes and/or algorithms described herein in relation to FIGS. 8 and/or 9 and/or 10.

The following provides an overview of several aspects of the present disclosure.

Aspect 1: A method of packet processing by a user equipment (UE), comprising: determining whether a difference between a sequence number of a first packet and a sequence number of a second packet received subsequent to receiving the first packet exceeds a sequence jump threshold; disregarding the second packet from processing in response to at least determining that the difference is greater than the sequence jump threshold; and receiving and processing a plurality of packets respectively associated with a plurality of sequence numbers that are greater than the sequence number of the first packet and less than the sequence number of the second packet.

Aspect 2: The method of aspect 1, wherein the sequence number of the first packet, the sequence number of the second packet, and the plurality of sequence numbers are a packet data convergence protocol (PDCP) sequence number of the first packet, a PDCP sequence number of the second packet, and a plurality of PDCP sequence numbers, respectively.

Aspect 3: The method of aspect 1 or 2, wherein the second packet is disregarded at least until one or more of the plurality of packets are received and processed.

Aspect 4: The method of any of aspects 1 through 3, further comprising: determining a maximum number of packets capable of being received within a reordering timer; and determining the sequence jump threshold based on the maximum number of packets.

Aspect 5: The method of any of aspects 1 through 4, wherein the sequence jump threshold is based on a number of bits allocated to indicate a sequence number of a packet.

Aspect 6: The method of any of aspects 1 through 5, further comprising: activating a reordering timer in response to determining that the difference is less than or equal to the sequence jump threshold; receiving and processing one or more packets of the plurality of packets while the reordering timer is activated; and discarding other one or more packets of the plurality of packets that are not received or processed when the reordering timer expires.

Aspect 7: The method of any of aspects 1 through 6, wherein the first packet is a last packet received prior to a cell change to a current base station utilized by the UE and the second packet is a packet received first after the cell change to the current base station.

Aspect 8: The method of any of aspects 1 through 7, wherein the disregarding the second packet in response to at least determining that the difference is greater than the sequence jump threshold comprises disregarding the second packet in response to determining that the difference is greater than the sequence jump threshold and that a number of packets received after a cell change to a current base station utilized by the UE and prior to receiving the second packet is less than or equal to a post-cell-change received packet threshold.

Aspect 9: The method of any of aspects 1 through 8, wherein the disregarding the second packet in response to at least determining that the difference is greater than the sequence jump threshold comprises discarding the second packet in response to at least determining that the difference is greater than the sequence jump threshold.

Aspect 10: The method of aspect 9, further comprising: discarding one or more packets each having a respective sequence number greater than the sequence number of the second packet in response to at least determining that the difference is greater than the sequence jump threshold; determining a number of discarded packets including the one or more discarded packets and the discarded second packet; and determining whether the number of discarded packets is less than a discard threshold; and discarding at least one additional packet each having a respective sequence number greater than sequence numbers of the discarded packets in response to at least determining that the difference is greater than the sequence jump threshold and that the number of discarded packets is less than the discard threshold.

Aspect 11: The method of aspect 10, wherein the discarded packets are discarded subsequent to a cell change to a current base station utilized by the UE.

Aspect 12: The method of aspect 10 or 11, further comprising: receiving and processing the at least one additional packet each having the respective sequence number greater than the sequence numbers of the discarded packets in response to at least determining that the number of discarded packets is greater than or equal to the discard threshold.

Aspect 13: The method of aspect 10 or 11, further comprising: determining whether a number of the plurality of packets received is greater than a received packet threshold, wherein the discarding the at least one additional packet in response to at least determining that the difference is greater than the sequence jump threshold and that the number of discarded packets is less than the discard threshold comprises discarding the at least one additional packet in response to determining that the difference is greater than the sequence jump threshold, that the number of discarded packets is less than the discard threshold, and that the number of the plurality of packets received is greater than the received packet threshold.

Aspect 14: The method of aspect 13, further comprising: receiving and processing the at least one additional packet each having the respective sequence number greater than sequence numbers of the discarded packets in response to determining that the number of discarded packets is greater than or equal to the discard threshold and/or that the number of the plurality of packets received is less than or equal to the received packet threshold.

Aspect 15: The method of any of aspects 9 through 14, further comprising: receiving and processing another second packet having the sequence number of the second packet after discarding the second packet and receiving the plurality of packets respectively associated with the plurality of sequence numbers that are greater than the sequence number of the first packet and less than the sequence number of the second packet.

Aspect 16: The method of any of aspects 1 through 15, wherein the disregarding the second packet comprises maintaining the second packet in a storage portion without processing the second packet, and wherein the method further comprises: retrieving the second packet from the storage portion and processing the second packet after receiving the plurality of packets.

Aspect 17: The method of any of aspects 1 through 16, wherein the first packet is a first packet data convergence protocol (PDCP) packet, the second packet is a second PDCP packet, and the plurality of packets are a plurality of PDCP packets, or wherein the first packet is a first radio link control (RLC) packet, the second packet is a second RLC packet, and the plurality of packets are a plurality of RLC packets.

Aspect 18: The method of aspect 17, wherein the first PDCP packet, the second PDCP packet, and the plurality of packets are received at a PDCP sublayer from an RLC sublayer and are processed at the PDCP sublayer, or wherein the first RLC packet, the second RLC packet, and the plurality of packets are received at an RLC sublayer from a media access control (MAC) sublayer and are processed at the RLC sublayer.

Aspect 19: The method of any of aspects 1 through 18, further comprising: activating a packet count timer when the second packet is received; receiving a plurality of post-jump packets having respective sequence numbers greater than or equal to the sequence number of the second packet until the packet count timer expires and/or a number of the plurality of post-jump packets reaches a second received packet threshold; determining a number of valid post-jump packets among the plurality of post-jump packets; determining whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold; and processing the plurality of post-jump packets in response to determining that the ratio exceeds the valid packet ratio threshold.

Aspect 20: The method of aspect 19, further comprising: discarding the plurality of post-jump packets in response to determining that the ratio does not exceed the valid packet ratio threshold.

Aspect 21: The method of aspect 19 or 20, wherein the determining the number of valid post-jump packets comprises: determining whether each of the plurality of post-jump packets is valid based on a header of a respective post-jump packet of the plurality of post-jump packets after deciphering the respective post-jump packet.

Aspect 22: A user equipment (UE) comprising: a transceiver configured to communicate with a radio access network, a memory, and a processor communicatively coupled to the transceiver and the memory, wherein the processor and the memory are configured to perform any one of aspects 1 through 21.

Aspect 23: A UE configured for wireless communication comprising at least one means for performing any one of aspects 1 through 21.

Aspect 24: A non-transitory processor-readable storage medium having instructions for a UE thereon, wherein the instructions, when executed by a processing circuit, cause the processing circuit to perform any one of aspects 1 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of packet processing by a user equipment (UE), comprising:
   determining whether a difference between a sequence number of a first packet and a sequence number of a second packet received subsequent to receiving the first packet exceeds a sequence jump threshold, prior to determining whether to process the second packet;
   disregarding the second packet from processing in response to at least determining that the difference is greater than the sequence jump threshold; and
   receiving and processing a plurality of packets respectively associated with a plurality of sequence numbers that are greater than the sequence number of the first packet and less than the sequence number of the second packet in response to at least determining that the difference is greater than the sequence jump threshold.

2. The method of claim 1, wherein the sequence number of the first packet, the sequence number of the second packet, and the plurality of sequence numbers are a packet data convergence protocol (PDCP) sequence number of the first packet, a PDCP sequence number of the second packet, and a plurality of PDCP sequence numbers, respectively.

3. The method of claim 1, wherein the second packet is disregarded at least until one or more of the plurality of packets are received and processed.

4. The method of claim 1, further comprising:
   determining a maximum number of packets capable of being received within a reordering timer; and
   determining the sequence jump threshold based on the maximum number of packets.

5. The method of claim 1, further comprising:
   activating a reordering timer in response to determining that the difference is less than or equal to the sequence jump threshold;
   receiving and processing one or more packets of the plurality of packets while the reordering timer is activated; and
   discarding other one or more packets of the plurality of packets that are not received or processed when the reordering timer expires.

6. The method of claim 1, wherein the first packet is a last packet received prior to a cell change to a current base station utilized by the UE and the second packet is a packet received first after the cell change to the current base station.

7. The method of claim 1, wherein the disregarding the second packet in response to at least determining that the difference is greater than the sequence jump threshold comprises disregarding the second packet in response to determining that the difference is greater than the sequence jump threshold and that a number of packets received after a cell change to a current base station utilized by the UE and prior to receiving the second packet is less than or equal to a post-cell-change received packet threshold.

8. The method of claim 1, wherein the disregarding the second packet in response to at least determining that the difference is greater than the sequence jump threshold comprises discarding the second packet in response to at least determining that the difference is greater than the sequence jump threshold.

9. The method of claim 8, further comprising:
discarding one or more packets each having a respective sequence number greater than the sequence number of the second packet in response to at least determining that the difference is greater than the sequence jump threshold;
determining a number of discarded packets including the one or more discarded packets and the discarded second packet;
determining whether the number of the discarded packets is less than a discard threshold; and
discarding at least one additional packet each having a respective sequence number greater than sequence numbers of the discarded packets in response to at least determining that the difference is greater than the sequence jump threshold and that the number of the discarded packets is less than the discard threshold.

10. The method of claim 9, wherein the discarded packets including the one or more discarded packets and the discarded second packet are discarded subsequent to a cell change to a current base station utilized by the UE.

11. The method of claim 9, further comprising:
receiving and processing the at least one additional packet each having the respective sequence number greater than the sequence numbers of the discarded packets including the one or more discarded packets and the discarded second packet in response to at least determining that the number of the discarded packets is greater than or equal to the discard threshold.

12. The method of claim 9, further comprising:
determining whether a number of the plurality of packets received is greater than a received packet threshold,
wherein the discarding the at least one additional packet in response to at least determining that the difference is greater than the sequence jump threshold and that the number of the discarded packets is less than the discard threshold comprises discarding the at least one additional packet in response to determining that the difference is greater than the sequence jump threshold, that the number of the discarded packets is less than the discard threshold, and that the number of the plurality of packets received is greater than the received packet threshold.

13. The method of claim 12, further comprising:
receiving and processing the at least one additional packet each having the respective sequence number greater than sequence numbers of the discarded packets including the one or more discarded packets and the discarded second packet in response to determining that the number of the discarded packets is greater than or equal to the discard threshold and/or that the number of the plurality of packets received is less than or equal to the received packet threshold.

14. The method of claim 8, further comprising:
receiving and processing another second packet having the sequence number of the second packet after discarding the second packet and receiving the plurality of packets respectively associated with the plurality of sequence numbers that are greater than the sequence number of the first packet and less than the sequence number of the second packet.

15. The method of claim 1, wherein the disregarding the second packet comprises maintaining the second packet in a storage portion without processing the second packet, and wherein the method further comprises:
retrieving the second packet from the storage portion and processing the second packet after receiving the plurality of packets.

16. The method of claim 1, wherein the first packet is a first packet data convergence protocol (PDCP) packet, the second packet is a second PDCP packet, and the plurality of packets are a plurality of PDCP packets, or wherein the first packet is a first radio link control (RLC) packet, the second packet is a second RLC packet, and the plurality of packets are a plurality of RLC packets.

17. The method of claim 16, wherein the first PDCP packet, the second PDCP packet, and the plurality of packets are received at a PDCP sublayer from an RLC sublayer and are processed at the PDCP sublayer, or wherein the first RLC packet, the second RLC packet, and the plurality of packets are received at an RLC sublayer from a media access control (MAC) sublayer and are processed at the RLC sublayer.

18. The method of claim 1, further comprising:
activating a packet count timer when the second packet is received;
receiving a plurality of post-jump packets having respective sequence numbers greater than or equal to the sequence number of the second packet until the packet count timer expires and/or a number of the plurality of post-jump packets reaches a second received packet threshold;
determining a number of valid post-jump packets among the plurality of post-jump packets;
determining whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold; and
processing the plurality of post-jump packets in response to determining that the ratio exceeds the valid packet ratio threshold.

19. The method of claim 18, further comprising:
discarding the plurality of post-jump packets in response to determining that the ratio does not exceed the valid packet ratio threshold.

20. The method of claim 18, wherein the determining the number of valid post- jump packets comprises:
determining whether each of the plurality of post-jump packets is valid based on a header of a respective post-jump packet of the plurality of post-jump packets after deciphering the respective post-jump packet.

21. A user equipment (UE) for packet processing, comprising:

at least one processor;
a transceiver communicatively coupled to the at least one processor; and
a memory communicatively coupled to the at least one processor,
wherein the at least one processor is configured to:
determine whether a difference between a sequence number of a first packet and a sequence number of a second packet received subsequent to receiving the first packet exceeds a sequence jump threshold, prior to determining whether to process the second packet;
disregard the second packet from processing in response to at least determining that the difference is greater than the sequence jump threshold; and
receive and process a plurality of packets respectively associated with a plurality of sequence numbers that are greater than the sequence number of the first packet and less than the sequence number of the second packet in response to at least determining that the difference is greater than the sequence jump threshold.

22. The UE of claim 21, wherein the sequence number of the first packet, the sequence number of the second packet, and the plurality of sequence numbers are a packet data convergence protocol (PDCP) sequence number of the first packet, a PDCP sequence number of the second packet, and a plurality of PDCP sequence numbers, respectively.

23. The UE of claim 21, wherein the at least one processor is further configured to:
determine a maximum number of packets capable of being received within a reordering timer; and
determine the sequence jump threshold based on the maximum number of packets.

24. The UE of claim 21, wherein the at least one processor is further configured to:
activate a reordering timer in response to determining that the difference is less than or equal to the sequence jump threshold;
receive and process one or more packets of the plurality of packets while the reordering timer is activated; and
discard other one or more packets of the plurality of packets that are not received or processed when the reordering timer expires.

25. The UE of claim 21, wherein the at least one processor configured to disregard the second packet in response to at least determining that the difference is greater than the sequence jump threshold is configured to discard the second packet in response to at least determining that the difference is greater than the sequence jump threshold.

26. The UE of claim 25, wherein the at least one processor is further configured to:
discard one or more packets each having a respective sequence number greater than the sequence number of the second packet in response to at least determining that the difference is greater than the sequence jump threshold;
determine a number of discarded packets including the one or more discarded packets and the discarded second packet;
determine whether the number of the discarded packets is less than a discard threshold; and
discard at least one additional packet each having a respective sequence number greater than sequence numbers of the discarded packets in response to at least determining that the difference is greater than the sequence jump threshold and that the number of the discarded packets is less than the discard threshold.

27. The UE of claim 26, wherein the at least one processor is further configured to:
receive and process the at least one additional packet each having the respective sequence number greater than the sequence numbers of the discarded packets including the one or more discarded packets and the discarded second packet in response to at least determining that the number of the discarded packets is greater than or equal to the discard threshold.

28. The UE of claim 21, wherein the at least one processor is further configured to:
activate a packet count timer when the second packet is received;
receive a plurality of post-jump packets having respective sequence numbers greater than or equal to the sequence number of the second packet until the packet count timer expires and/or a number of the plurality of post-jump packets reaches a second received packet threshold;
determine a number of valid post-jump packets among the plurality of post-jump packets;
determine whether a ratio of the number of valid post-jump packets to a total number of packets received by the UE exceeds a valid packet ratio threshold, the total number of packets being a number of packets received by the UE until the packet count timer expires and/or the number of the plurality of post-jump packets reaches the second received packet threshold; and
process the plurality of post-jump packets in response to determining that the ratio exceeds the valid packet ratio threshold.

29. A non-transitory processor-readable storage medium having instructions thereon for a user equipment (UE), wherein the instructions, when executed by a processing circuit, cause the processing circuit to:
determine whether a difference between a sequence number of a first packet and a sequence number of a second packet received subsequent to receiving the first packet exceeds a sequence jump threshold, prior to determining whether to process the second packet;
disregard the second packet from processing in response to at least determining that the difference is greater than the sequence jump threshold; and
receive and process a plurality of packets respectively associated with a plurality of sequence numbers that are greater than the sequence number of the first packet and less than the sequence number of the second packet in response to at least determining that the difference is greater than the sequence jump threshold.

30. A user equipment (UE) for packet processing, comprising:
means for determining whether a difference between a sequence number of a first packet and a sequence number of a second packet received subsequent to receiving the first packet exceeds a sequence jump threshold, prior to determining whether to process the second packet;
means for disregarding the second packet from processing in response to at least determining that the difference is greater than the sequence jump threshold; and
means for receiving and processing a plurality of packets respectively associated with a plurality of sequence numbers that are greater than the sequence number of the first packet and less than the sequence number of the second packet in response to at least determining that the difference is greater than the sequence jump threshold.

\* \* \* \* \*